US 6,545,739 B1

(12) United States Patent
Matsumoto et al.

(10) Patent No.: US 6,545,739 B1
(45) Date of Patent: Apr. 8, 2003

(54) TUNABLE WAVELENGTH FILTER USING NANO-SIZED DROPLETS OF LIQUID CRYSTAL DISPERSED IN A POLYMER

(75) Inventors: Shiro Matsumoto, Tokyo (JP); Katsuhiko Hirabayashi, Tokyo (JP); Yasuyuki Sugiyama, Tokyo (JP); Seizou Sakata, Tokyo (JP); Takayoshi Hayashi, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 09/154,414

(22) Filed: Sep. 16, 1998

(30) Foreign Application Priority Data

Sep. 19, 1997 (JP) .............................. 9-254735
Jul. 27, 1998 (JP) ............................ 10-211029

(51) Int. Cl.[7] ........................ G02F 1/1333; G02F 1/13
(52) U.S. Cl. ........................ 349/198; 349/89; 349/90
(58) Field of Search ........................... 349/198, 89, 90

(56) References Cited

U.S. PATENT DOCUMENTS

| | | | | |
|---|---|---|---|---|
| 4,869,847 A | * | 9/1989 | Leslie et al. | 252/299.01 |
| 5,084,203 A | * | 1/1992 | Sansone et al. | 359/900 |
| 5,150,236 A | * | 9/1992 | Patel | 349/198 |
| 5,225,930 A | * | 7/1993 | Land et al. | 359/578 |
| 5,321,539 A | * | 6/1994 | Hirabayashi | 356/352 |
| 5,425,115 A | * | 6/1995 | Wagner | 385/16 |
| 5,452,127 A | * | 9/1995 | Wagner | 359/486 |
| RE35,337 E | * | 9/1996 | Patel et al. | 349/198 |
| 5,731,889 A | * | 3/1998 | Jeong et al. | 359/258 |
| 5,786,915 A | * | 7/1998 | Scobey | 359/127 |
| H1911 H | * | 11/2000 | Land | 264/1.36 |

FOREIGN PATENT DOCUMENTS

| | | | |
|---|---|---|---|
| EP | 0 282 963 A | 9/1988 | C09K/19/00 |
| WO | WO 97/40420 | 10/1997 | |

OTHER PUBLICATIONS

Adomenas et al, "Influence of Plasticizers on the Values of Operational Voltages of Microencapsulated Liquid Crystals", Mol Crystals Liq Crystals, 1992, vol. 215, pp. 153–160.*
European Search Report for Application EP 98 30 7649, dated Nov. 25, 1999, 3 pages.
Patent Abstracts of Japan, vol. 16, No. 571 (P–1459), JP 04 220618A (Abstract).
Derwent Publications Ltd., London, GB; AN 1992–313357, XP 02122863 (Abstract of JP 04 220618A).
Sansone et al.: "Large Kerr Effects in Transparent Encapsulated Liquid Crystals", Journal of Applied Physics, US, American Inst. of Physics, NY, vol. 67, No. 9, pp. 4253–4259, XP 002035040.

(List continued on next page.)

Primary Examiner—Kenneth Parker
(74) Attorney, Agent, or Firm—Fitch, Even, Tabin & Flannery

(57) ABSTRACT

Fabry-Perot etalon type tunable wavelength-selective filter comprises: a first layer including a transparent electrode and an optical mirror layer; a third layer including a transparent electrode and an optical mirror layer; and a second layer which is composed of a material with a refractive index variable with electric field, and sandwiched between the first layer and the third layer, wherein the material having a refractive index variable with electric field is composed by dispersing liquid crystal droplets equal to or less than 150 nm in diameter in a light transmissive characteristic medium such as a polymer or silica glass, and by adding plasticizer therein. In this structure, the optical mirror layer consists of a dielectric multilayer mirror with an optical reflectance of equal to or more than 95% for 1.5 μm wavelength light, and the glass substrate has a finishing surface precision of equal to or less than $\lambda/10$, where $\lambda$ is a wavelength of light that traverses the tunable wavelength-selective filter.

13 Claims, 26 Drawing Sheets

OTHER PUBLICATIONS

Katsuhiko Hirabayashi et al.: "Tunable Wavelength–Selective Liquid Crystal Filters for 600–Channel FDM System", IEEE Photonics Technology Letters, US, IEEE, Inc. NY, vol. 4, No. 6, pp. 597–599, XP 000275547.

Matsumoto et al.: "Fine Droplets of Liquid Crystals in a Transparent Polymer and Their Response to an Electric Field", Applied Physics Letters, US, American Institute of Physics, NY, vol. 69, No. 8, pp. 1044–1046, XP 000626133.

"High–Speed Continuously Tunable Liquid Crystal Filter for WDM Networks", Sneh and Johnson, *Journal of Lightwave Technology*, vol. 14, No. 6, Jun. 1996, pp. 1067–1079.

"Dielectric Multilayer ed Interference Filters Deposited on Polymide Films", Ogushi et al., *Electronics Letters*, Apr. 25th 1991, vol. 27, No. 9., pp. 706–707.

American Institute of Physics, "Fine Droplets of liquid cyrstals in a transparaent polymer and their response to an electric field", Matsumoto et al., *Appl. Phys. Lett. 69 (8)* Aug. 19, 1996, pp. 1044–1046.

"Electro–optic Effect and Propagation Loss in Polymer films Containing Nano–sized Droplets of Liquid Crystal"; *Technical Digest*, vol. 14, 1997, OSA Technical Digest Ser., Conf. Ed.; Matsumoto et al., pp. 90/ThC5–1—92/ThC5–3, American CSO/OSA (Organic Thin Films for Photonics Applications–Conference held Oct. 15–17, 1997, Long Beach, California).

*IEEE, Transactions Photonics Technology Letters*, vol. 3, No. 12, Dec., 1991, pp. 1091–1093, "Polarization–Independent Tunable Wavelength–Selective Filter Using a Liquid Crystal", Hirabayashi et al.

* cited by examiner

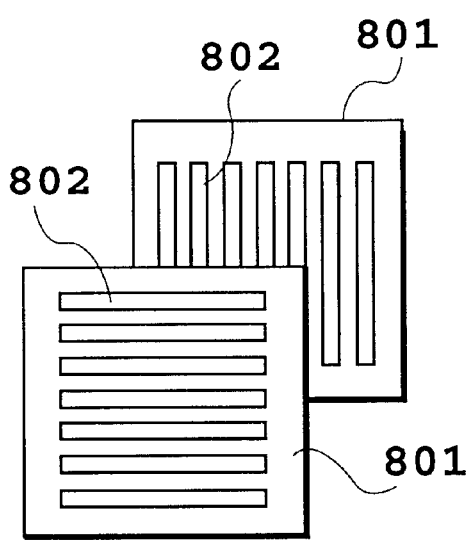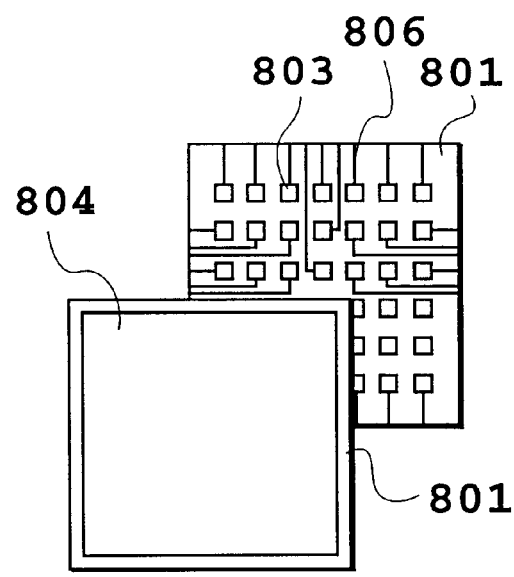
*FIG.13*  *FIG.14*

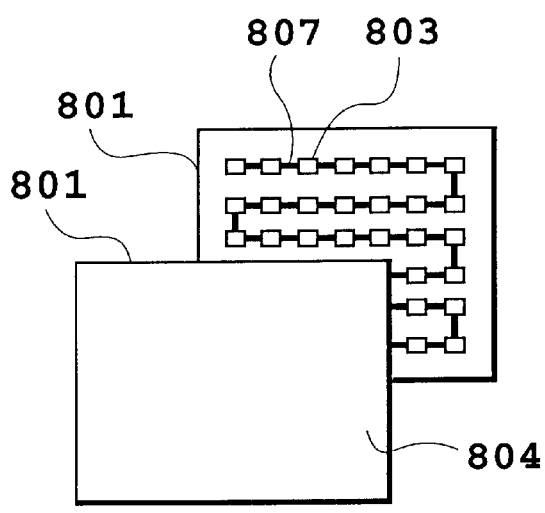 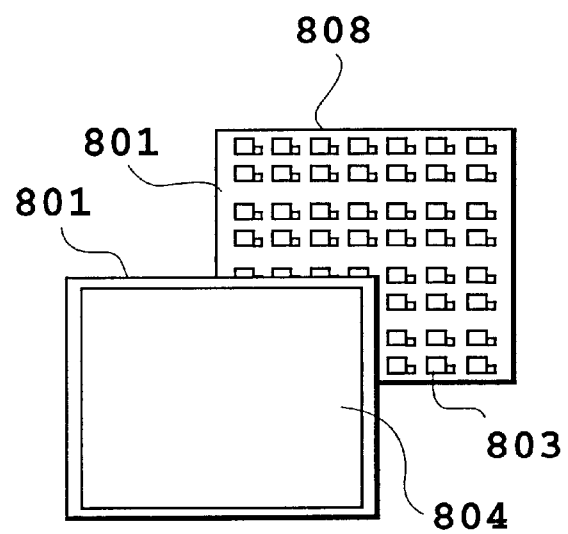
*FIG.15*  *FIG.16*

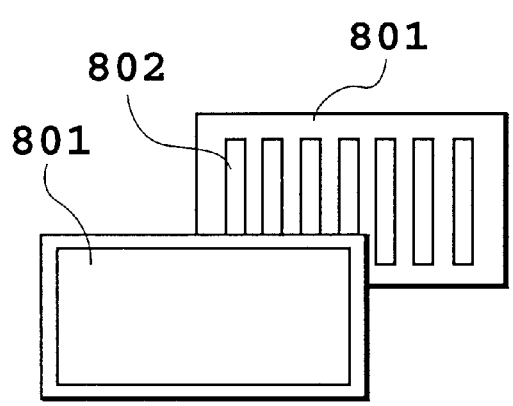 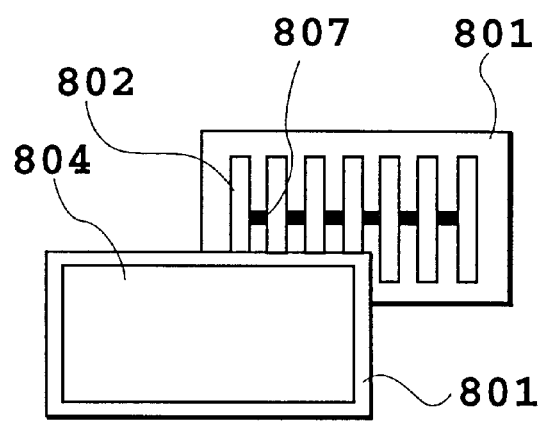
*FIG.17*  *FIG.18*

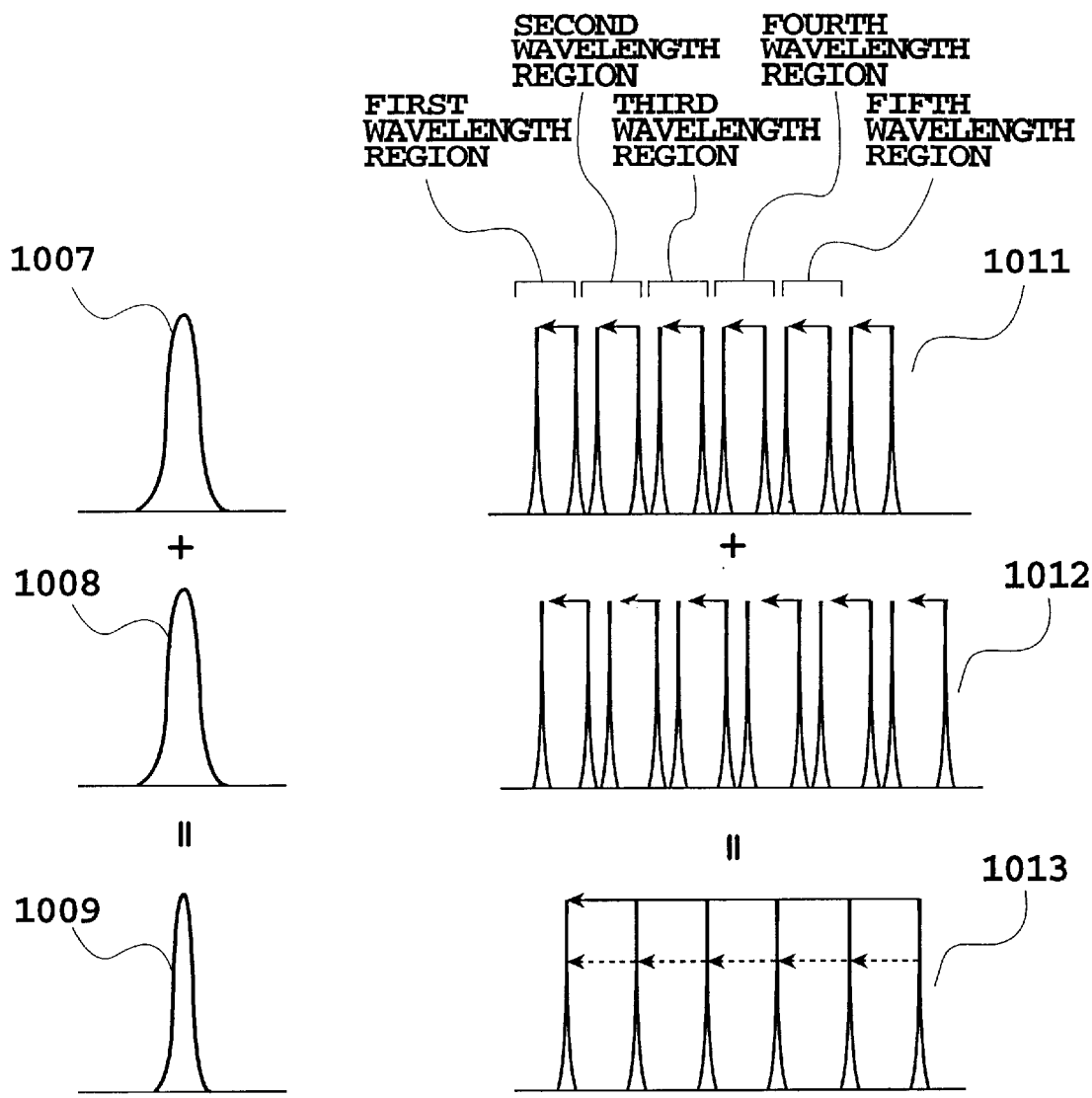
*FIG.21B*  *FIG.21C*

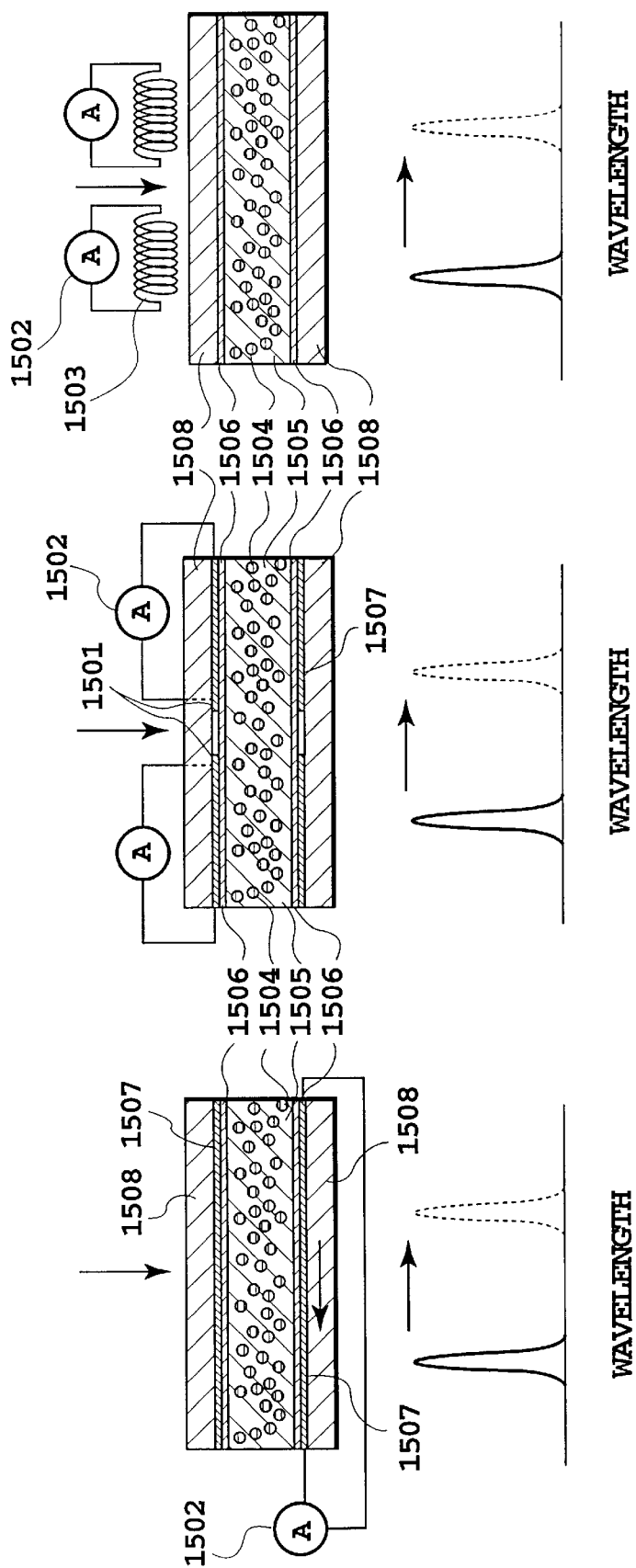

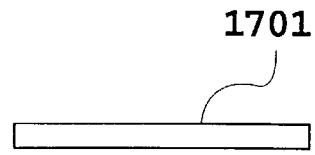
FIG.33A
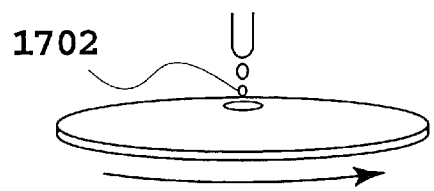
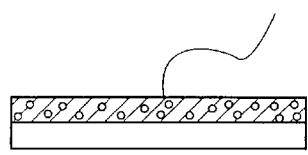
FIG.33B
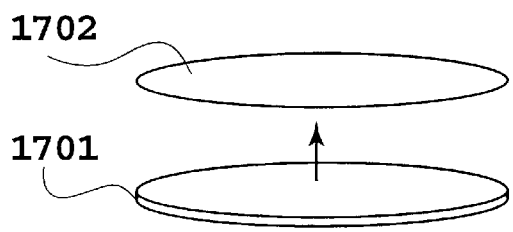
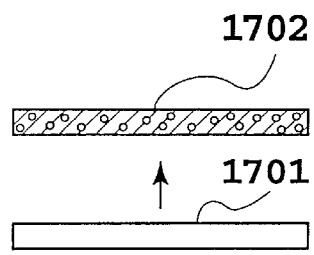
FIG.33C
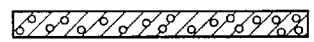
FIG.33D
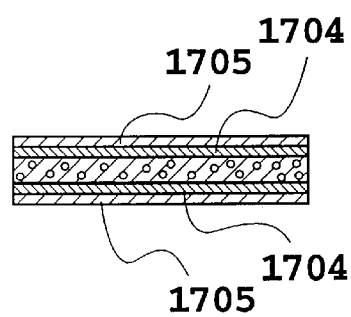
FIG.33E
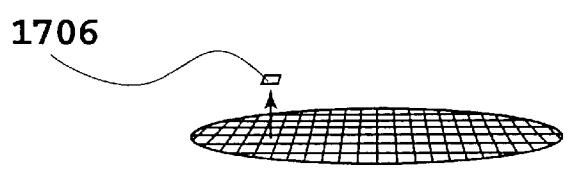
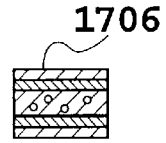
FIG.33F

TUNABLE WAVELENGTH FILTER USING NANO-SIZED DROPLETS OF LIQUID CRYSTAL DISPERSED IN A POLYMER

This application is based on Japanese Patent Application No. 254,735/1997 filed Sep. 19, 1997 and Japanese Patent Application No. 211,029/1998 filed Jul. 27, 1998, the contents of which are incorporated hereinto by reference.

BACKGROUND OF THE INVENTION

1. Field of the Invention

The present invention relates to a tunable wavelength-selective filter capable of tunably selecting any optical signal from among wavelength-division multiplexed optical signals in an optical fiber, and to a manufacturing method for fabricating a high performance, inexpensive tunable wavelength-selective filter.

2. Description of the Related Art

Optical communication systems employing optical fibers have been rapidly put into practice because they can transmit large capacity information at a high speed. At present, however, they can only transmit only optical pulses with a particular wavelength. If they can transmit optical pulses at multiple different frequencies, they will be able to transmit larger capacity of information. This technique is called wavelength-division multiplexing (WDM), and is intensively researched. To achieve the wavelength-division multiplexing, a tunable wavelength-selective filter is necessary which can select only an optical signal of a desired wavelength from among optical pulses with multiple wavelengths.

As conventional tunable wavelength-selective filters of such a kind, there are a grating filter which controls its angle with a motor, a tunable wavelength-selective filter which moves its dielectric filter with a motor, and an etalon filter which controls its cavity length with a piezoelectric element. However, since they are mechanically controlled, they have drawbacks of being slow in response, bulk in module size, and expensive in cost.

To solve the foregoing problems of the tunable wavelength-selective filter, the assignee of the present application proposed a filter capable of varying the optical gap of a Fabry-Perot etalon by applying a voltage across a nematic liquid crystal material filled in the etalon as disclosed in Japanese Patent Application Laying-open No. 220,618/1992. Since the tunable wavelength-selective filter is a planar type device, it has an advantage of being able to be arrayed easily.

The filter using the nematic liquid crystal material, however, has a problem in that it cannot achieve a tuning rate beyond the maximum response rate of the nematic liquid crystal material of about a few milliseconds. A high tuning rate is an essential characteristic for implementing the wavelength-division multiplexing (WDM) in a high speed LAN (local-area network). In addition, since the liquid crystal filters utilize the orientations of the liquid crystal materials varied by applied voltages, their variations in refractive index are not uniform depending on the polarization state or direction of a plane of polarization of incident light. This causes so-called polarization dependence in which the tuning characteristics vary in response to the plane of polarization, which presents a problem in practical use. It is reported that a tunable wavelength-selective filter employing a chiral smectic A has a high response rate of about 10 microseconds. However, it has only a narrow tunable range, and its polarization dependence has yet to be improved (A. Sneh and K. Johnson, "High-speed continuously tunable liquid crystal filter for WDM network", J. Lightwave Technol. vol. 14, p. 1067, 1996). Accordingly, to implement the WDM in high speed optical LANS, it is desired to develop tunable wavelength-selective filters of being able to solve the foregoing two problems, that is, fast response, polarization-independent tunable wavelength-selective filters of highly practical utility.

On the other hand, low cost, highly reliable, fixed wavelength filters with optical fibers have been developed (T. Oguchi, J. Noda, H. Hanafusa and S. Nishi, "Dielectric multilayered interference filters deposited on polyimide films", Electronics Letters, Vol. 27, pp. 706–707, 1991). The fixed wavelength filters with optical fibers are each fabricated by forming a dielectric mirror film on a polyimide film, by dicing it into few millimeter squares, and by embedding them into slots formed in the optical fibers. The fixed wavelength filters with optical fibers employ the polyimide film instead of glass as a substrate, which makes it possible for the dielectric mirror to be diced into few millimeter squares, and to be thinned to about a few tens of micrometers of thickness, enabling them to be inserted into the slots formed in the optical fibers. This obviates optical components such as lenses, and tedious alignment, making it possible to implement a very cheap and highly reliable fixed wavelength filters. However, it is difficult for the fixed wavelength filters with optical fibers to tunably control the filter transmission wavelength.

SUMMARY OF THE INVENTION

The present invention is implemented to solve the foregoing problems involved in the conventional techniques. It is therefore an object of the present invention to provide a polarization-independent tunable wavelength-selective filter with a high response rate and high speed tuning capability by utilizing as a cavity a material in which liquid crystal droplets are dispersed in a light transmissive characteristic medium.

Another object of the present invention is to provide a tunable wavelength-selective filter capable of increasing its tunable range per voltage by adding plasticizer into a polymer material in which the liquid crystal droplets are dispersed and by thus reducing the driving voltage of the liquid crystal droplets, although the liquid crystal droplets have an inclination to increase the driving voltage as their sizes decrease.

Still another object of the present invention is to provide a tunable wavelength-selective filter which is lower in cost and higher in reliability than the conventional tunable wavelength-selective filters, and capable of implementing higher density and smaller size by combining with arrayed optical fibers.

Another object of the present invention is to provide a tunable wavelength-selective filter capable of improving its spectrum characteristics, and of extending its wavelength tunable range to the entire wavelength range by stacking multiple tunable wavelength-selective filters or by using a planar mirror or prism mirror.

A still another object of the present invention is to provide a tunable wavelength-selective filter capable of simply constituting an optical multiplexer or demultiplexer by using a planar mirror.

In order to solve the problems aforementioned, a tunable wavelength-selective filter of a Fabry-Perot etalon type according to the present invention is constructed such that it comprises: a first layer including a transparent electrode and an optical mirror layer; a third layer including a transparent electrode and an optical mirror layer; and a second layer which is composed of a material with a refractive index variable with electric field, and sandwiched between the first layer and the third layer, wherein the material having a refractive index variable with electric field is composed by dispersing liquid crystal droplets equal to or less than 150 nm in diameter in a light transmissive characteristic medium such as a polymer or silica glass.

In the above structure, the optical mirror layer consists of a dielectric multilayer mirror with an optical reflectance of equal to or more than 95% for 1.5 μm wavelength light, and the glass substrate has a finishing surface precision of equal to or less than λ/10, where λ is a wavelength of light that traverses the tunable wavelength-selective filter.

Further, in the above structure, the liquid crystal droplets consist of nematic liquid crystal droplets, and the polymer contains a plasticizer.

The wavelength-selective filter can be arranged in such a manner that it comprises on its second side one of a prism mirror and a plane mirror, wherein one of a light beam and a light beam array, which is incident on its first side, passes through it, reflects off one of the prism mirror and the plane mirror, and passes through it, and is emitted from its first side.

A fabrication method of a tunable wavelength-selective filter of a Fabry-Perot etalon type according to the present invention comprises the steps of: forming on a transparent substrate of equal to or less than 250 micrometers thick a first layer composed of a transparent electrode layer and an optical mirror layer; forming a second layer by uniformly applying on the first layer a fine liquid-crystal-droplet-dispersed polymer layer in which liquid crystal droplets 150 nanometers or less in diameter are dispersed in a matrix, and by polymerizing the fine liquid-crystal-droplet-dispersed polymer layer; forming on the fine liquid-crystal-droplet-dispersed polymer layer a third layer composed of a transparent electrode layer and an optical mirror layer; and dicing a filter fabricated through the previous steps into 5 millimeter or greater squares.

The fabrication method above can be further provided with the steps of adding a plasticizer to a mixed liquid of a liquid crystal material and a thermo polymerization or photo polymerization prepolymer; carrying out spinning; and carrying out heating or light irradiation.

According to the present invention, a polarization-independent tunable wavelength-selective filter with a high response rate and high speed tuning capability is implemented using the material in which the liquid crystal droplets are dispersed into the light transmissive characteristic medium.

According to the present invention, a tunable wavelength-selective filter which is cheaper in cost, higher in density and smaller in size than the conventional tunable wavelength-selective filters is implemented by combining with the arrayed optical fibers.

According to the present invention, stacking the tunable wavelength-selective filters in multiple layers or employing the planar mirror or the prism mirror can improve the spectrum characteristics, and extend the wavelength tunable range to all the wavelengths.

According to the present invention, employing the planar mirror makes it possible to simply construct the optical multiplexer or demultiplexer.

According to the present invention, a high speed LAN wavelength-division multiplexing transmission system can be constructed.

Finally, the tunable wavelength-selective filter in accordance with the present invention can greatly increase the extinction ratio of the Fabry-Perot etalon filter because it is possible for the Fabry-Perot etalon filters that use the fine liquidcrystal-droplet-dispersed polymer as their cavity to be stacked in multiple layers.

The above and other objects, effects, features and advantages of the present invention will become more apparent from the following description of the embodiments thereof taken in conjunction with the accompanying drawings.

BRIEF DESCRIPTION OF THE DRAWINGS

FIGS. 13–18 are diagrams showing examples of transparent electrode patterns formed on a pair of transparent substrates in the array structure of the embodiment 4;

FIGS. 21A–21C are a cross-sectional view and graphs illustrating structures and characteristics of major portions of an embodiment 5 of the tunable wavelength-selective filter in accordance with the present invention;

FIGS. 31A–31C are cross-sectional views illustrating schematic structures of a major portion of an embodiment 10 of the tunable wavelength-selective filter in accordance with the present invention;

FIG. 33A–33F are perspective views and their cross-sectional views illustrating fabrication process of an embodiment 12 of the tunable wavelength-selective filter in accordance with the present invention.

DETAILED DESCRIPTION OF PREFERRED EMBODIMENTS

Figure 1:
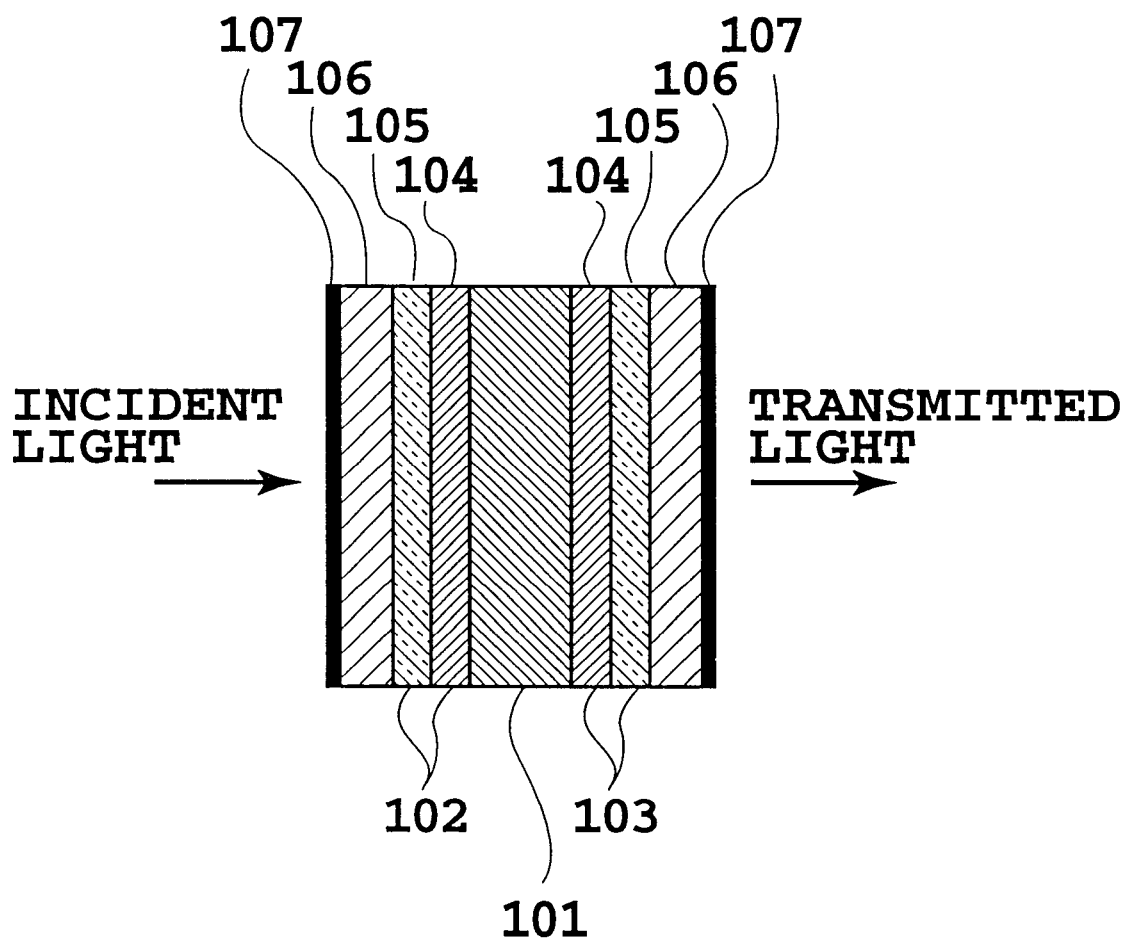
FIG. 1 is a diagram illustrating a fundamental structure of a tunable wavelength-selective filter in accordance with the present invention.

The invention will now be described with reference to the accompanying drawings.

In the following description of the embodiments, the same reference numerals designate portions of the same functions throughout the entire drawings, and the duplicated description thereof will be omitted.

Generally, polymer-dispersed liquid crystal layers in which a polymer such as a photo polymerization resin is mixed with a nematic liquid crystal material are used in display devices, optical shutters or the like by utilizing their characteristics that they function as a scattering medium while no voltage is applied, whereas as a transparent medium while a voltage is applied.

The polymer-dispersed liquid crystal layers in accordance with the present invention, however, differ from those used in the display devices or optical shutters in that they employ, as a medium that changes its refractive index by applying voltage, a medium in which very small liquid crystal droplets whose particle diameters are equal to or less than 150 nm are dispersed in a polymer or glass material with a high optical transmittance.

The very small liquid crystal droplets used in the polymer-dispersed liquid crystal layers in accordance with the present invention are characterized in that they do not scatter incident light regardless of whether the voltage is applied or not, and that they change the refractive index because of the operation of the liquid crystals, thereby enabling selection of the wavelength of the incident light. Accordingly, the polymer-dispersed liquid crystal layers in accordance with the present invention are called a "fine liquid-crystal-droplet-dispersed polymer" in the present specification.

The liquid crystal droplets with a particle diameter of equal to or less than 150 nm exhibit an extremely faster response than bulk liquid crystals, and their transmission loss is smaller because they do not function as a scattering medium as mentioned before owing to their particle diameters which are much smaller than the wavelength of light commonly used in Fabry-Perot interferometer filter systems. Such high speed response and low transmission loss of the liquid crystal droplets with the particle diameter of equal to or less than 150 nm are characteristics that cannot be seen in liquid crystal droplets of a micrometer order in diameter which have been studied to be applied to display devices using scattering.

Figure 2A:
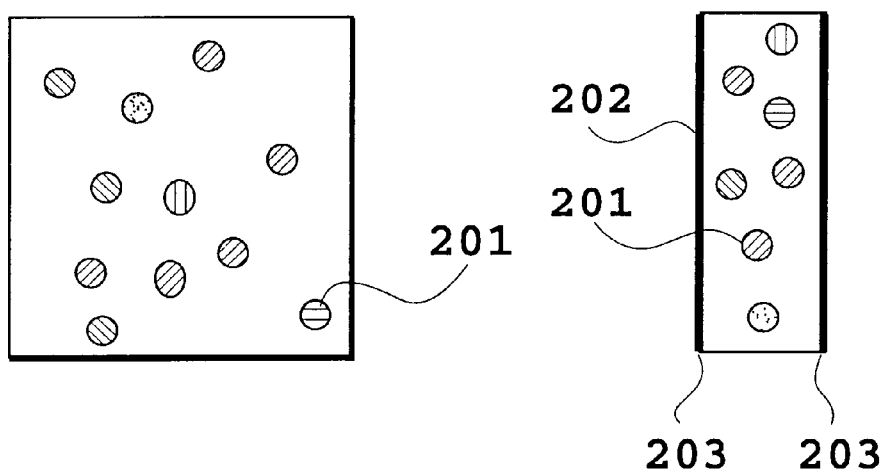
FIGS. 2A and 2B are diagrams illustrating a structure and operation principle of a medium in accordance with the present invention, whose refractive index varies with an applied voltage.
Figure 2B:
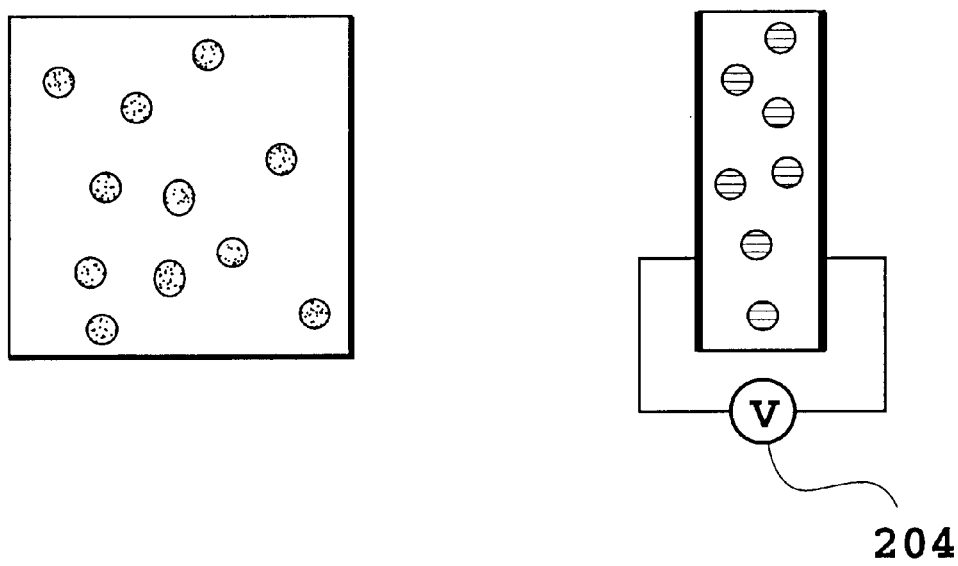

FIGS. 2A and 2B are diagrams illustrating a structure and operation principle of the fine liquid-crystal-droplet-dispersed polymer, and schematically illustrates the orientations of the directors of liquid crystal droplets 201, when a voltage is applied on the nanometer-order liquid crystal droplets 201 in the same direction as the incident light in a nematic liquid crystal material with positive dielectric anisotropy. In FIG. 2A, the reference numeral 202 designates polymer layer, and 203 designates an electrode. In FIG. 2B, the reference numeral 204 designates a driving power supply.

In these drawings, FIG. 2A shows the case where no voltage is applied, and FIG. 2B shows the case where a voltage is applied. In addition, the left-hand side figures of these drawings are seen from the direction of the incident light, whereas the right-hand side figures are seen from the direction normal to the incident light.

In these figures, when no voltage is applied, since the orientations of the liquid crystal molecules in the liquid crystal droplets 201 are random, and the sizes of the liquid crystal droplets 201 are much smaller than the wavelength of the light, there is no anisotropy in the plane on the order of magnitude of the light wavelength. Hence, the refractive indices of the medium can be considered equal for any planes of polarization.

When the voltage is applied, although the directors of the liquid crystal molecules of the liquid crystal droplets 201 try to become normal to the plane, changes in the refractive indices of the medium are uniform for any planes of polarization. Accordingly, the changes in the refractive indices of the medium due to the voltage are polarization-independent, and the filter characteristics are also polarization-independent.

FIG. 1 is a diagram illustrating the fundamental structure of the tunable wavelength-selective filter in accordance with the present invention.

In FIG. 1, the reference numeral 101 designates a second layer, 102 designates a first layer, 103 designates a third layer, 104 designates an optical mirror (dielectric mirror), 105 designates a transparent electrode, 106 designates a transparent substrate and 107 designates an AR coating (antireflection coating). As the transparent substrate 106, a synthetic silica glass is used with a surface roughness precision of less than $\lambda/10$.

The second layer 101 is composed of a material whose refractive index is varied by the electric field, in which the liquid crystal droplets of 150 nm or less in diameter are dispersed in a light transmissive characteristic medium such as a polymer or silica glass material. In this case, the second layer 101 must be transparent over the used wavelength range.

Thus, in the tunable wavelength-selective filter in accordance with the present invention as shown in FIG. 1, since the refractive index of the second layer 101 is polarization-independent regardless of whether the voltage is applied or not, the characteristics of the tunable wavelength-selective filter are also polarization-independent.

The matrix medium in which the liquid crystal droplets are dispersed can be any transparent material, and are not particularly specified. However, a highly light transmissive and optically isotropic polymers can be used such as polymethyl methacrylate polymer, polystyrene polymer, polycarbonate polymer, thermo polymerization or photo polymerization acrylic polymer, epoxy polymer, polyurethane polymer, polyisocyanate series, and polyene polythiol series, or glass.

A typical fabrication method of the second layer 101, when the matrix medium is a polymer, is to obtain liquid crystals by phase separation from the mixture of the liquid crystals and a polymer or prepolymer: For example, a method is taken of separating the liquid crystal droplets from a matrix polymer by removing an organic solvent into which the matrix polymer and liquid crystals are dissolved; or a method is taken of phase separating, by applying heat or light irradiation, liquid crystal droplets from a polymerized matrix polymer in which liquid crystals are dissolved into a thermo polymerization or photo polymerization prepolymer. The photo polymerization polymer is preferable for fabrication.

To obtain the liquid crystal droplets of the size defined in the present invention by any of the foregoing methods, phase separation must be carried out quickly by rapid removal of the solvent or rapid polymerization of the prepolymer. On the other hand, when the matrix medium is a glass material, the liquid crystal droplets are fabricated by immersing in the liquid crystals a porosity glass material with pore diameters corresponding to the liquid crystal droplets with sizes defined in the present invention.

Although nematic liquid crystals, cholesteric liquid crystals or ferroelectric liquid crystals can be used as the liquid crystal material, a nematic liquid crystal material is preferable because its refractive index is varied greatly by the changes in the orientations. In addition, it is preferable that the diameters of the particulate liquid crystals be equal to or less than 150 nm as mentioned before. This is because when the diameters are greater than 150 nm, the scattering due to the refractive index difference between the liquid crystal droplets and medium becomes large, and hence only insufficient optical transmittance can be obtained. In contrast, the scattering loss becomes extremely small when the diameters are equal to or less than 100 nm. Although smaller diameter liquid crystal droplets tend to increase the response rate, they require greater drive voltage. Thus, it is preferable that the diameters of the liquid crystal droplets be greater than a few nanometers at which practical applied voltage can be used.

The small liquid crystal droplets exhibit the response of less than a few tens of microseconds which is much faster than bulk liquid crystals. Besides, since the liquid crystal droplets of that size are much smaller than the wavelength of light commonly used in the optical communication systems, they do not operate as a scattering medium, and hence has a small transmission loss of 1–2 dB/cm.

Although the stacking order of the transparent electrode 105 and optical mirror layer 104 in the first layer 102 or third layer 103 can be altered, it is preferable that the optical mirror layer 104 is placed closer to the second layer 101, that is, in the inner side as shown in FIG. 1. This is because a higher performance tunable wavelength-selective filter can be obtained by reducing the transmission loss of the cavity between the two optical mirrors 104.

The transparent electrodes 105 constituting the first layer 102 and third layer 103 may be the same or different types, and not specified. They can be made of a thin film of indium oxide doped with tin oxide or a thin film of tin oxide, which are formed by an evaporation or sputtering method.

The optical mirrors 104 constituting one part of the first layer 102 and third layer 103 can be the same type or different types as long as they provide over a predetermined wavelength range a desired reflectivity which is preferably greater than 95% or so. As examples of the optical mirrors 104 used in the infrared region, are a multilayer of Te—KBr, Al—Ge—SiO, Cu—Ge—SiO, Au—Ge—SiO or TiO$_2$—SiO$_2$. They can also be formed by the evaporation or sputtering method.

The fundamental structure of the tunable wavelength-selective filter in accordance with the present invention as shown in FIG. 1 can be fabricated through the following process, for example.

First, the substrate 106 is prepared which is transparent over a used wavelength band, such as a glass substrate or a plastic substrate made of polymethyl methacrylate, polycarbonate or the like. Then, the first layer 102 (or the third layer 103) is formed by depositing the transparent electrode 105 and optical mirror layer 104 on the transparent substrate 106.

Second, a film of a mixed solution of a liquid crystal material and a photo polymerization or thermo polymerization prepolymer is formed by spin coating on the first layer 102 or the third layer 103 formed on the substrate 106. In this state, the prepolymer is subjected to polymerization by heat or irradiation, and then to phase separation to generate the very small liquid crystal droplets in the polymer.

Third, the substrates 106, on which the third layer 103 (or the first layer 102), that is, the optical mirror layer 104 and transparent electrode 105 are deposited, are stacked on the liquid-crystal-droplet-dispersed polymer formed on the first layer 102 (or the third layer 103), thereby forming the tunable wavelength-selective filter. It is preferable that the outer surfaces of the transparent substrate 106 be coated with the AR coatings 107 to reduce reflection thereon.

As an alternative method of the above-mentioned second step, a film of a mixed solution of a liquid crystal material and a photo polymerization or thermo polymerization prepolymer can be filled between the space that is formed by sandwiching a spacer of a predetermined thickness between the two substrates 106 on which the transparent electrode 105 and optical mirror layer 104 are deposited each, and the very small liquid crystal droplets can be formed in the polymer by subjecting the prepolymer to polymerization by heat or irradiation, and then to phase separation.

Furthermore, the liquid crystal droplets can be produced by sandwiching, between the two substrates 106 on which the optical mirror layer 104 and transparent electrode 105 are deposited each, a porous glass substrate that has pores of 150 nm or less in diameter and is immersed in a liquid crystal material to fill the pores with the liquid crystal material, and by fixing them in close contact with each other.

Incidentally, the surface roughness, thickness and size of the films constituting the tunable wavelength-selective filter as shown in FIG. 1 are not specified as long as they are in practical ranges. The thickness of the second layer 101 (cavity length), however, is an important factor that determines spacings between optical resonance wavelengths (called FSR (free spectral range) from now on), and has an influence on the full width at half maximum of the spectrum of light that can be separated. Therefore, this thickness must be determined considering the tunable range of the filter, which usually ranges from a few micrometers to one hundred micrometers.

Figure 3A:
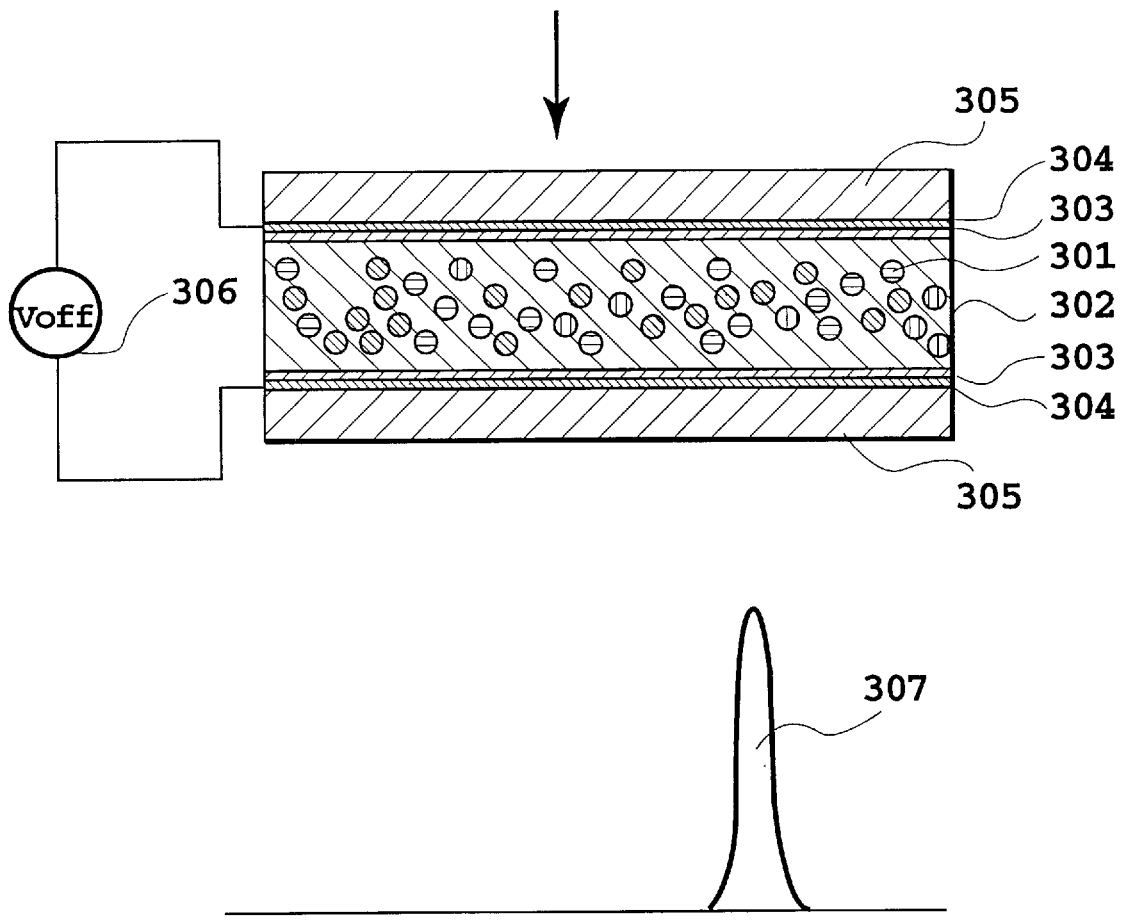
FIGS. 3A and 3B are diagrams illustrating a structure and operation principle of the tunable wavelength-selective filter in accordance with the present invention.
Figure 3B:
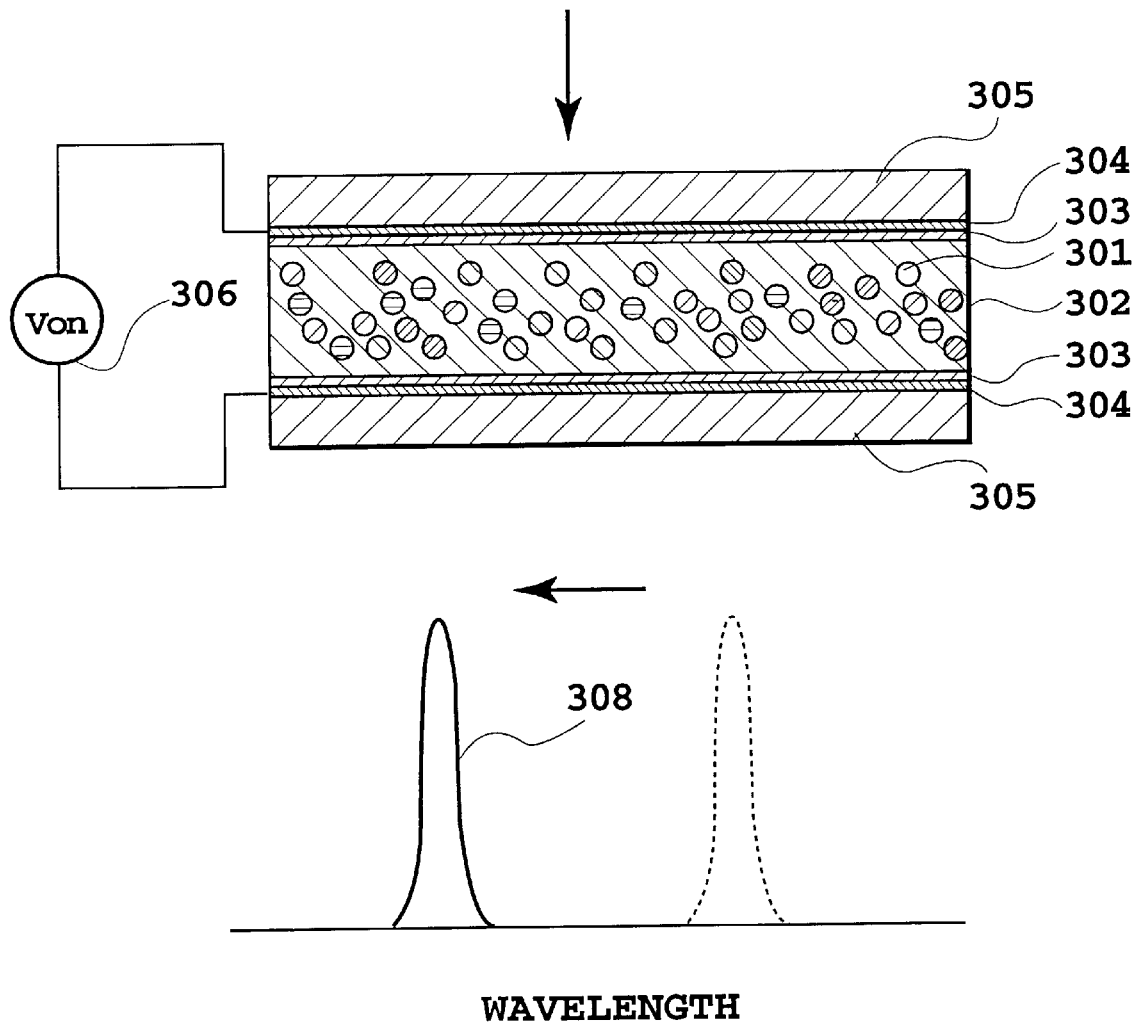

FIGS. 3A and 3B are diagram illustrating the structure and operation principle of the tunable wavelength-selective filter in accordance with the present invention. The fundamental structure of the tunable wavelength-selective filter in accordance with the present invention as shown in FIGS. 3A and 3B employs a polymer as a matrix medium, and forms a Fabry-Perot etalon tunable wavelength-selective filter, in which the fine liquid-crystal-droplet-dispersed polymer is sandwiched between the mirrors of the cavity.

In FIG. 3A, the reference numeral 301 designates nematic liquid crystal droplets with particle diameters of equal to or less than 150 nm; 302 designates a polymer layer for confining the liquid crystal material; 303 designates an optical mirror (dielectric mirror) layer; 304 designates a transparent electrode; 305 designates a transparent substrate and 306 designates an AC power supply. The reference numeral 307 designates a transmitted spectrum component when no voltage is applied, whereas 308 designates a transmitted spectrum component when a voltage is applied.

As illustrated in FIG. 3A, while no voltage is applied, the liquid crystal molecules in the nematic liquid crystal droplets 301 take random orientations so that the incident light onto the fine liquid-crystal-droplet-dispersed polymer layer experiences the refractive index equal to the average refractive index ($n_e$, $n_o$) of the nematic liquid crystal material.

In contrast, as illustrated in FIG. 3B, the liquid crystal molecules take the same direction as the field induced by the applied voltage so that their refractive index approaches $n_o$.

Assuming the value $n_e$ and $n_o$ is 1.717 and 1.513, the average refractive index is about 1.581. Therefore, the wavelength of the transmitted light, which is equal to the resonance wavelength of the filter transmission wavelength shifts from the wavelength 307 as illustrated in FIG. 3A to a shorter wavelength 308 as shown in FIG. 3B.

Changes in the refractive index of the fine liquid-crystal-droplet-dispersed polymer is given by the following expression (1) (see, S. Matsumoto, et al. "Organic Thin Films for Photonic Applications", Technical Digest, P. 90, 1997).

$$\Delta n = kE^2 \quad (1)$$

where E is expressed in terms of V/$\mu$m, and k is a constant of proportionality depending on the size and density of the liquid crystal droplets, and normally takes a value from $1 \times 10^{-5}$ to $2 \times 10^{-4}$ when the value $n_e$ and $n_o$ is 1.717 and 1.513, respectively. The relationships between the refractive index changes and the wavelength shift amounts $\Delta \lambda$ can be expressed by the following equation.

$$\Delta \lambda = 1550 \times \Delta n / n \text{ (nm)} \quad (2)$$

For example, when $k = 4 \times 10^{-5}$, and 600 V is applied to the 20 micrometer thick fine liquid-crystal-droplet-dispersed polymer, an electric field of 30 V/$\mu$m is applied, which causes the refractive index change $\Delta n$ of 0.036, and the wavelength change of 37 nm can be expected. The electric field, however, equals the dielectric breakdown voltage, and in practice a maximum tunable range of about 15 nm can be expected by applying 400 V.

The embodiments of the present invention will now be described with reference to the accompanying drawings.

In the following description of the embodiments, the same reference numerals designate portions with the same functions throughout the entire drawings, and the duplicated description thereof will be omitted.

EMBODIMENT 1

An embodiment 1 of the tunable wavelength-selective filter in accordance with the present invention is a Fabry-Perot etalon type tunable wavelength-selective filter with the same structure as that of FIG. 3A, which is fabricated through the following process.

First, a substrate of a silica glass or the like (305 of FIG. 3A) is prepared, on which a transparent electrode (304 of FIG. 3A) composed of ITO (indium-tin oxide) and an optical mirror layer (303 of FIG. 3A) are deposited by the evaporation method. Here, the optical mirror layer consists of a dielectric multilayer with an optical reflectivity of 97% at the wavelength of 1.5 micrometers, and the surface finishing precision of the substrate is desirably less than $\lambda/10$.

On the substrate, a film of a mixture of a liquid UV (ultraviolet) polymerization prepolymer (NOA81 of Norland Products, for example) and a nematic liquid crystal material (BL24 of MERCK Industrial Chemicals, for example) is formed using the spin coating method. Here, the mixing rate of the prepolymer to the nematic liquid crystal material is 10 g to 50 g, and the film thickness is 20 micrometers.

Then, the film is irradiated by the light of a metal halide lamp to polymerize the resin and to form the liquid crystal droplets in the resin.

The same two substrates thus formed are stacked to form the Fabry-Perot etalon type tunable wavelength-selective filter.

Figure 4:
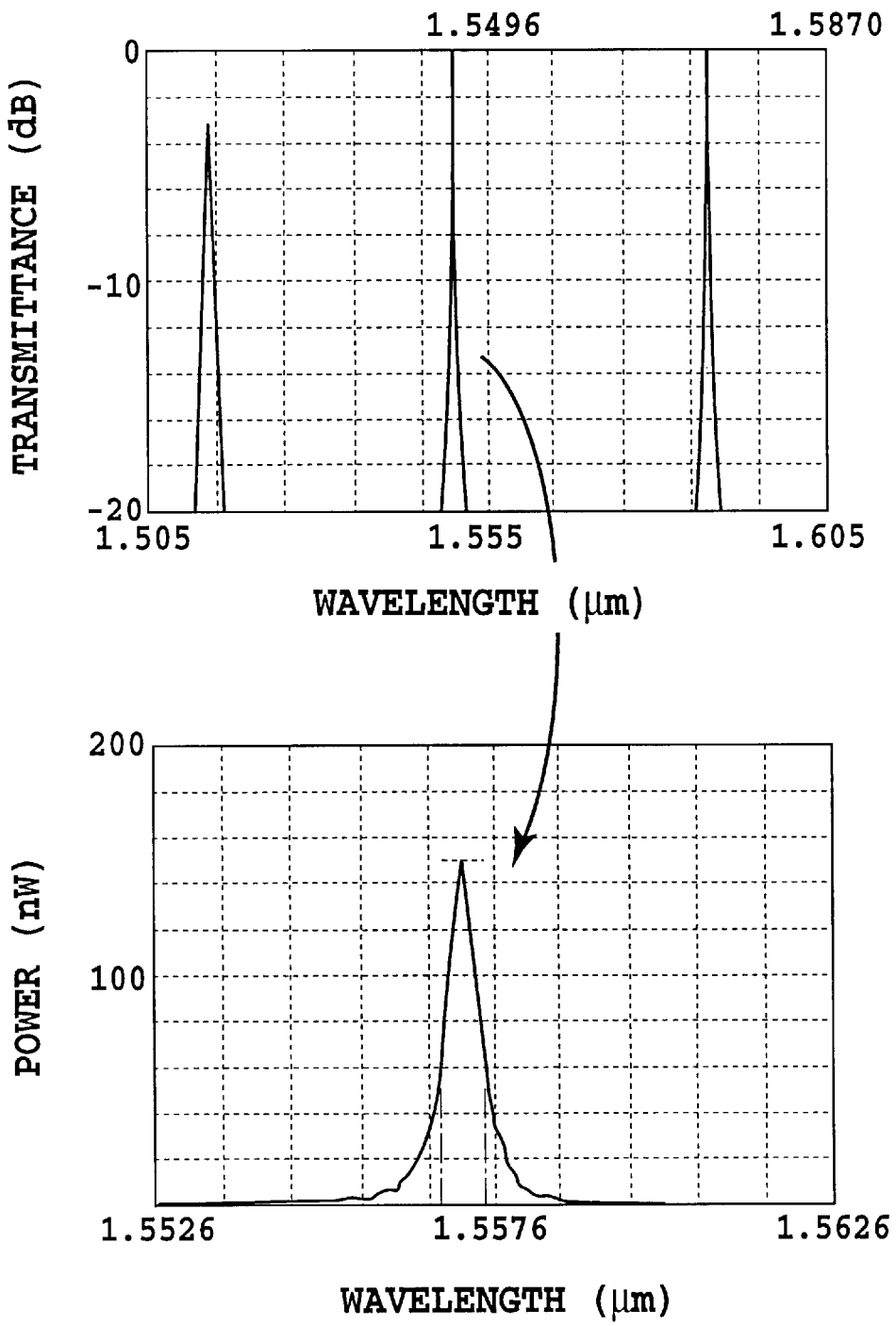
FIG. 4 indicates two graphs illustrating transmission spectra of an embodiment 1 of the tunable wavelength-selective filter in accordance with the present invention.

FIG. 4 illustrates a spectrum of transmitted light when wideband laser light of 1.5 $\mu$m struck the substrate perpendicularly to the substrate in the tunable wavelength-selective filter of the present embodiment 1. It was confirmed that the spectrum of the transmitted light was independent of the polarization rotation of the incident light. The FSR of the transmitted light was 37.4 nm, the full width at half maximum was 0.6 nm, and the transmission loss was 2.37 dB.

Figure 5:
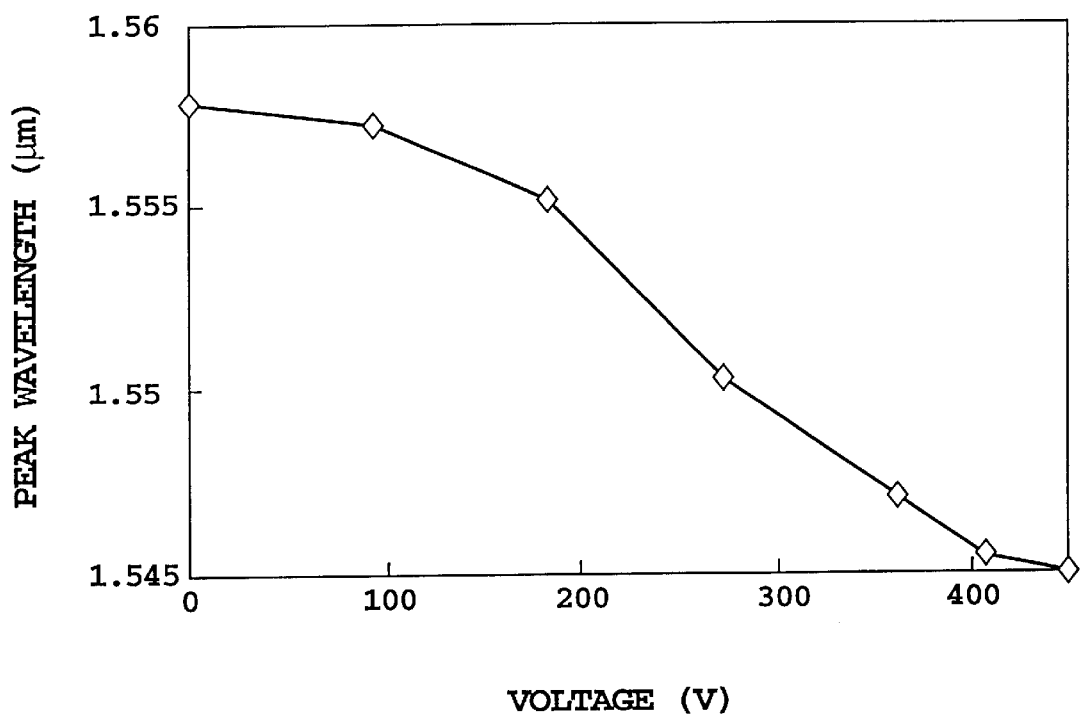
FIG. 5 is a graph illustrating the voltage dependence of the wavelengths of light that transmits the embodiment 1 of the tunable wavelength-selective filter.

Next, changes in the wavelength of the transmitted light was observed while applying a voltage to the present embodiment 1 of the tunable wavelength-selective filter. FIG. 5 is a graph illustrating the dependence of the wavelength of the transmitted light on the voltage. As clearly seen from FIG. 5, the wavelength of the transmitted light changes by 12.7 nm by applying 450 V in the present embodiment 1 of the tunable wavelength-selective filter. In addition, the amount of changes in the wavelength of the transmitted light was maintained in spite of the polarization rotation of the incident light. These results show that the Fabry-Perot etalon, which employs as the cavity the material in which the liquid crystal droplets are dispersed, functions as the polarization-independent tunable wavelength-selective filter.

Response waveforms of the filter were observed by applying square pulses, each of which has an amplitude of 400 V and a width of 2 ms. The response waveforms had the rising time and falling time of a few tens to a few hundred microseconds, which exhibits a fast response.

EMBODIMENT 2

The present embodiment 2 of the tunable wavelength-selective filter in accordance with the present invention is also the Fabry-Perot etalon type tunable wavelength-selective filter with the same structure as that of FIG. 3A, and is fabricated through the following process.

FIGS. 6–10 are diagrams illustrating the fabrication process of the present embodiment 2 of the tunable wavelength-selective filter.

Figure 6:
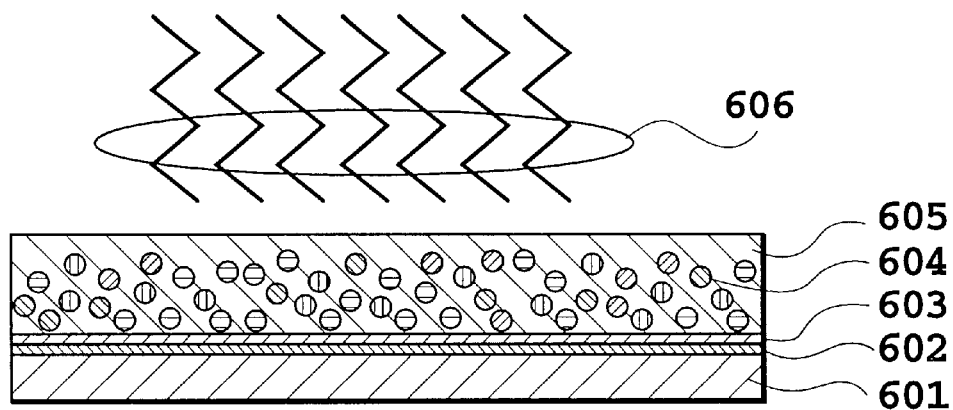
FIGS. 6–10 are cross-sectional views illustrating a fabrication process of an embodiment 2 of the tunable wavelength-selective filter in accordance with the present invention.

First, as shown in FIG. 6, a substrate 601 of a silica glass or the like is prepared, on which a transparent electrode 602 composed of ITO (indium-tin oxide) and an optical mirror layer 603 are deposited by the evaporation method. Here, the optical mirror layer 603 is a dielectric multilayer mirror film with an optical reflectivity of 97% at the wavelength of 1.5 micrometers, and the surface finishing precision of the substrate 601 is preferably less than $\lambda/10$.

On the substrate, an approximately 20 $\mu$m thick film of a mixture of a UV (ultraviolet) polymerization resin and a nematic liquid crystal material is formed using the spin coating method. Here, the mixing rate of the UV polymerization resin to the nematic liquid crystal material is 100 g to 50 g. Then, the film is irradiated by uniform UV rays 606 using a metal halide lamp to polymerize the resin and to form the liquid crystal droplets 604 in the resin (polymer) layer 605, thereby forming the fine liquid-crystal-droplet-dispersed polymer layer.

Figure 7:
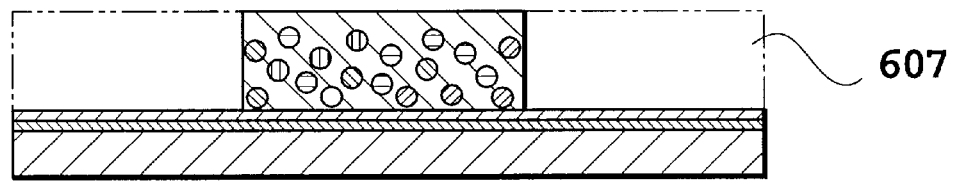
Figure 8:
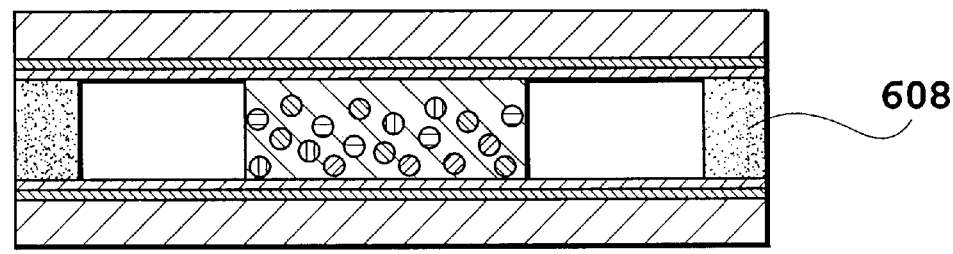

Next, as shown in FIG. 7, portions 607 of the fine liquid-crystal-droplet-dispersed polymer, which are on each side of the surface of the substrate, are removed. Subsequently, as shown in FIG. 8, an adhesive 608 is applied on part of the substrate from which the fine liquid-crystal-droplet-dispersed polymer is removed, and the second substrate is bonded such that the optical mirror layers 603 are disposed in parallel, and that the interference fringes occurring between the opposed optical mirrors 603 become minimum while observing them. The second substrate comprises the substrate 601 of silica glass or the like, and the transparent electrode 602 composed of ITO and the optical mirror layer 603, which are deposited on the substrate 601 by the evaporation method.

Figure 9:
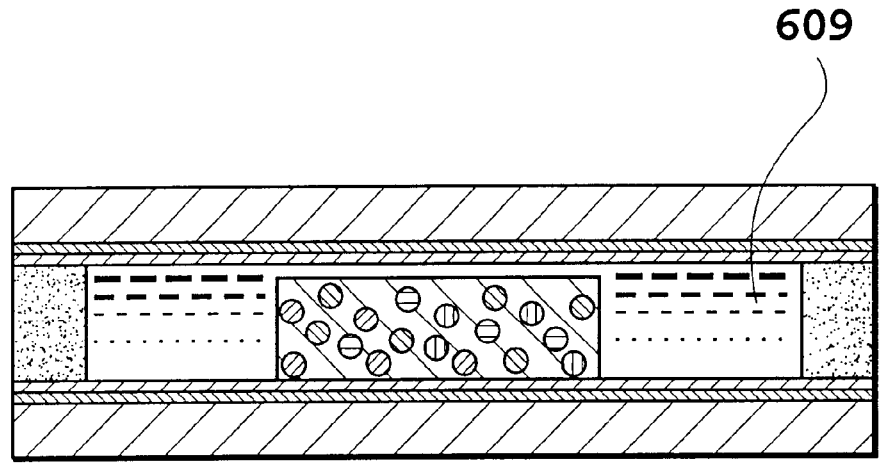
Figure 10:
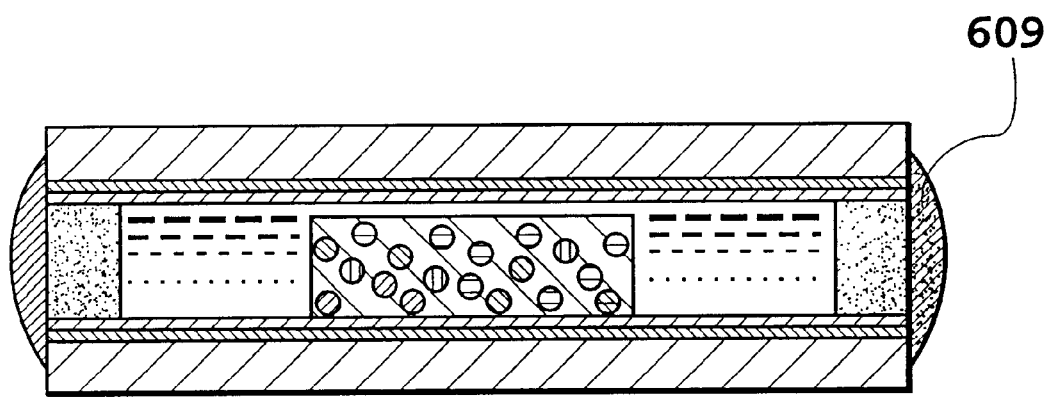

In this case, a void is left between the upper substrate and the fine liquid-crystal-droplet-dispersed polymer layer, and in spaces from which the portions 607 are removed. To fill the void as shown in FIG. 9, an adhesive (or matching oil) 609 whose refractive index agrees with that of the fine liquid-crystal-droplet-dispersed polymer is poured into the gap between the fine liquid-crystal-droplet-dispersed polymer layer and the optical mirror layer 603 using a capillary attraction. Finally, as shown in FIG. 10, the periphery is sealed by applying a sealing compound 610.

According to the present embodiment 2, the transparent layer (adhesive or matching oil) 609, which is formed between the fine liquid-crystal-droplet-dispersed polymer layer and an interface of the optical mirror layer 603, and has the refractive index equal to that of the fine liquid-crystal-droplet-dispersed polymer, can prevent undesired optical reflection, and hence improve the characteristics of the tunable wavelength-selective filter.

EMBODIMENT 3

The foregoing embodiment 1 of the tunable wavelength-selective filter, that is, a Fabry-Perot etalon type tunable wavelength-selective filter that employs as the cavity material the polymer in which the nanometer-size liquid crystal droplets are dispersed, has a tendency to require an increasing voltage for driving the liquid crystal droplets as their sizes become smaller.

In view of this, the present embodiment 3 of the tunable wavelength-selective filter tries to reduce the voltage for driving the liquid crystal droplets and to increase the tunable range of the tunable wavelength-selective filter per voltage, by adding to the polymer in which the liquid crystal droplets are dispersed a substance (plasticizer) that is effective for plasticization.

Among the plasticizers are dibutyl phthalate, di-n-octyl phthalate, di-2-ethylhexyl phthalate, dinonyl phthalate, dilauryl phthalate, butyl benzyl phthalate, di-2-ethylhexyl adipate, di-2-ethylhexyl sebacate, tricresyl phosphate, tri-2-ethylhexyl phosphate, ester compounds of polyethylene glycol and ester compounds of epoxy aliphatic acid.

The present embodiment 3 of the tunable wavelength-selective filter is fabricated as follows.

First, a substrate of a silica glass or the like (305 of FIG. 3A) is prepared, on which a transparent electrode (304 of FIG. 3A) composed of ITO (indium-tin oxide) and an optical mirror layer (303 of FIG. 3A) are deposited by the evaporation method. Here, the optical mirror layer consists of a dielectric multilayer with an optical reflectivity of 97% at the wavelength of 1.5 micrometers, and the surface finishing precision of the substrate is preferably less than $\lambda/10$.

On the substrate, a film of a mixture of a liquid UV (ultraviolet) polymerization polyene polythiol prepolymer (NOA81 of Norland Products, for example), a nematic liquid crystal material (BL24 of MERCK Industrial Chemicals, for example) and a plasticizer is formed using the spin coating method. Then, the film is irradiated by the light of a metal halide lamp to polymerize the resin and to form the liquid crystal droplets in the resin.

A pair of the substrates thus formed are stacked to form the Fabry-Perot etalon type tunable wavelength-selective filter with the same structure as that shown in FIG. 3A.

Figure 11:
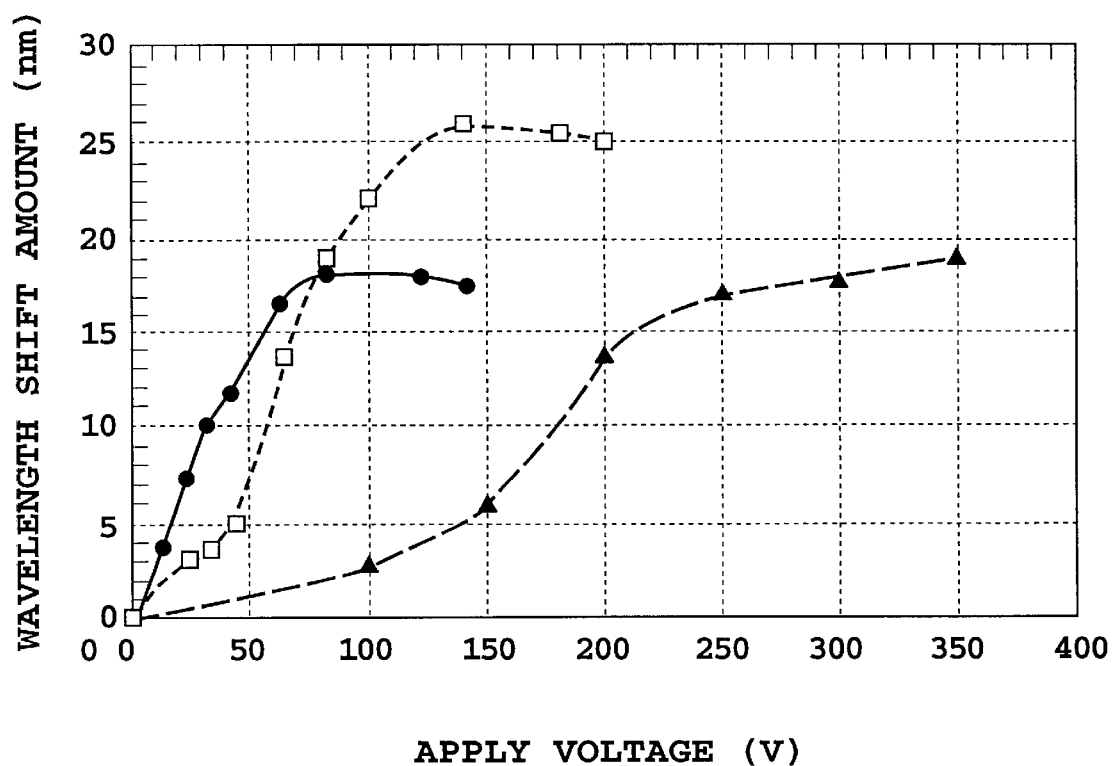
FIG. 11 is a graph illustrating the voltage dependence of wavelength shift amounts of light that transmits an embodiment 3 of the tunable wavelength-selective filter in accordance with the present invention.

FIG. 11 illustrates the relationships between the voltage that is applied to the present embodiment 3 of the tunable wavelength-selective filter which was fabricated in practice, and wavelength shift amounts of transmitted light through the filter. In other words, FIG. 11 is a graph representing the voltage dependence of the wavelength shift amount of the transmitted light through the present embodiment 3 of the tunable wavelength-selective filter.

In FIG. 11, solid circles represent the measured results of the present embodiment 3 of the tunable wavelength-selective filter which added the di-2-ethylhexyl adipate as the plasticizer; open squares represent those of the present embodiment 3 of the tunable wavelength-selective filter which added the tricresyl phosphate as the plasticizer; and solid triangles represent those of the tunable wavelength-selective filter which did not add any plasticizer, that is, the foregoing embodiment 1 of the tunable wavelength-selective filter.

Here, the present embodiment 3 of the tunable wavelength-selective filter that added the di-2-ethylhexyl adipate as the plasticizer has the mixing ratios of the polyene polythiol prepolymer, the nematic liquid crystal material and the di-2ethylhexyl adipate equal to 100 g: 60 g: 7 g, and the film thickness is about 20 micrometers.

Likewise, the present embodiment 3 of the tunable wavelength-selective filter that added the tricresyl phosphate as the plasticizer has the mixing ratios of the polyene polythiol prepolymer, the nematic liquid crystal material and the tricresyl phosphate equal to 100 g: 60 g: 7 g, and the film thickness is about 20 micrometers.

Furthermore, the foregoing embodiment 1 of the tunable wavelength-selective filter without any additional plasticizer has the mixing ratio of the polyene polythiol prepolymer and the nematic liquid crystal material equal to 100 g: 60 g, and the film thickness is about 20 micrometers.

As clearly seen from FIG. 11, the present embodiment 3 of the tunable wavelength-selective filter which added the plasticizer such as di-2-ethylhexyl adipate or tricresyl phosphate can achieve larger wavelength shift amounts by applying lower voltages than the foregoing embodiment 1 of the tunable wavelength-selective filter without adding any plasticizer can.

EMBODIMENT 4

Figure 12:
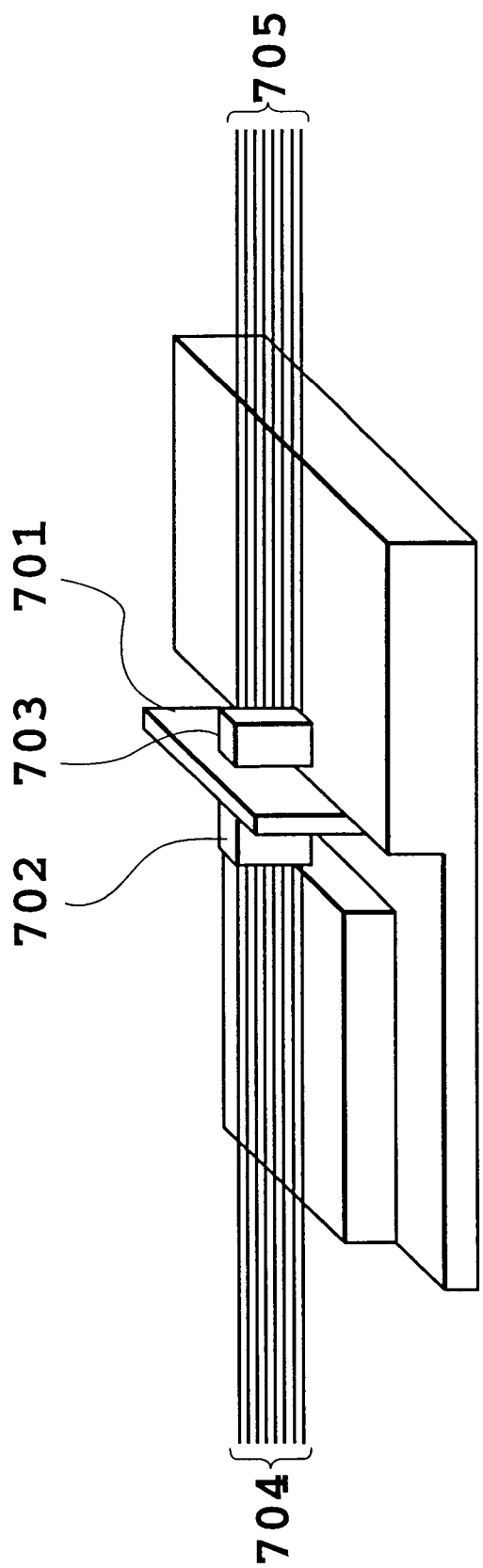
FIG. 12 is a perspective view of an embodiment 4 of the tunable wavelength-selective filter in accordance with the present invention.

FIG. 12 is a perspective view of an embodiment 4 of the tunable wavelength-selective filter in accordance with the present invention. The present embodiment 4 of the tunable wavelength-selective filter is an arrayed tunable wavelength-selective filter making use of the fact that the tunable wavelength-selective filter in accordance with the present invention is a planar device.

In FIG. 12, the reference numeral 701 designates an arrayed tunable wavelength-selective filter; 702 and 703 each designate an optical collimator array that inputs and outputs an optical beam array; 704 designates an input fiber array; and 705 designates an output fiber array.

The arrayed tunable wavelength-selective filter 701 of the present embodiment 4 includes a material (the fine liquid-crystal-droplet-dispersed polymer layer described in the foregoing embodiments, or the like) which is sandwiched between a pair of transparent substrates, wherein the refractive index of the material is changed by the electric field, and each of the transparent substrate has a transparent electrode and optical mirror layer formed thereon.

FIGS. 13–18 are diagrams showing transparent electrode patterns formed on the pair of the transparent substrates in the arrayed tunable wavelength-selective filter 701 in the present embodiment 4.

In FIGS. 13–18, the reference numeral 801 designates the pair of the transparent substrates; 802 designates stripe-like transparent electrodes; 803 designates square transparent electrodes arrayed in a matrix; 804 designates a transparent electrode formed on the entire surface of the substrate; 806 designates lead electrodes of the square transparent electrodes 803, leading to the edges of the substrate; 807 designates thin film resistors; and 808 designates thin film transistors each for controlling the voltage applied to each of the square transparent electrodes 803.

In the transparent electrode patterns as shown in FIG. 13, the stripe-like transparent electrodes 802 are formed perpendicularly to each other, so that a voltage can be applied to each intersection of the stripe-like transparent electrodes 802 independently by driving the stripe-like transparent electrodes 802.

In the transparent electrode patterns as shown in FIG. 14, each of the square transparent electrodes 803 are led to one of the edge of the substrate via a lead electrode 806, so that a voltage can be applied to each of the square transparent electrodes 803 independently.

In the transparent electrode patterns as shown in FIG. 15, the square transparent electrodes 803 are connected in series through the thin film resistors 807, so that the voltage applied to each of the square transparent electrodes 803 is determined by the values of the individual thin film resistors 807 once the voltages are determined which are applied to the initial square transparent electrode 803 and the terminal square transparent electrode 803.

In the transparent electrode patterns as shown in FIG. 16, the thin film transistors 808 are formed in one-to-one correspondence with the square transparent electrodes 803, so that a voltage is applied to each of the square transparent electrodes 803 independently by turning on the thin film transistors 808 in a row (or column), and at the same time by applying a voltage to the sources of the thin film transistors 808 in a column.

In the transparent electrode patterns as shown in FIG. 17, the stripe-like transparent electrodes 802 are formed on one of the transparent substrates 801, so that a voltage can be applied to each transparent electrode 802 independently.

In the transparent electrode patterns as shown in FIG. 18, the stripe-like transparent electrodes 802 are formed on one of the transparent substrates 801, and are connected in series through the thin film resistors 807, so that the voltage applied to each of the stripe-like transparent electrodes 802 is determined by the values of the individual thin film resistors 807 once the voltages are determined which are applied to the initial stripe-like transparent electrode 802 and the terminal stripe-like transparent electrode 802.

Figure 19:
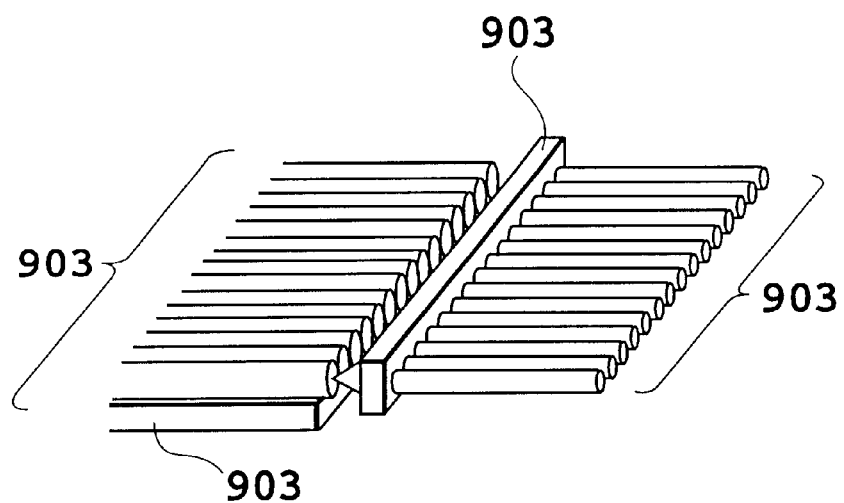
FIGS. 19 and 20 are perspective views each showing a schematic structure of an optical collimator array of the embodiment 4.
Figure 20:
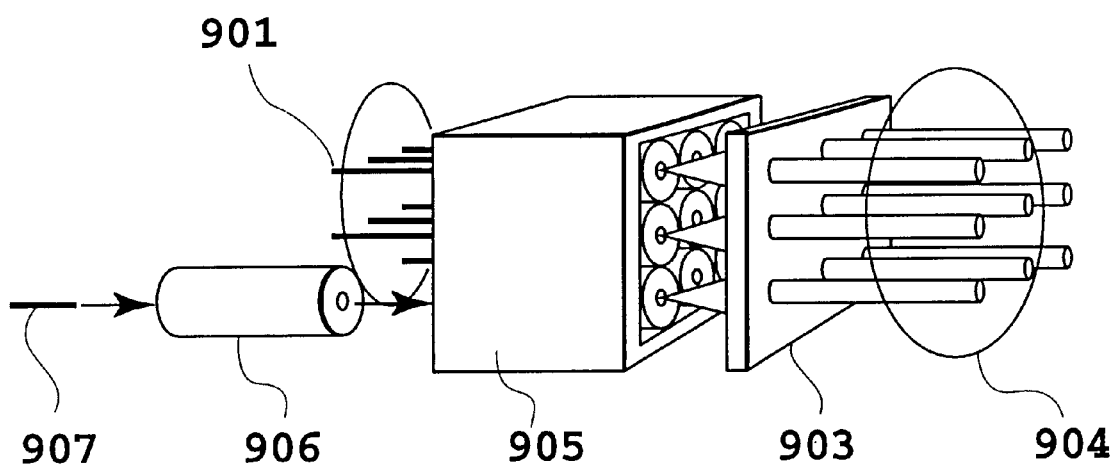

FIGS. 19 and 20 are each a perspective view schematically showing the optical collimator array 702 or 703 of the present embodiment 4.

FIG. 19 illustrates a one-dimensional optical collimator array, in which the reference numeral 901 designates a fiber array; 902 designates a V-groove substrate with a V-groove array spaced at regular intervals; 903 designates a microlens array; and 904 designates an output light beam array. The optical collimator array is built by disposing the optical fibers in the V-grooves in the V-groove substrate 902, and by attaching the planar microlens array 903 to the end faces of the optical fibers.

FIG. 20 illustrates a two-dimensional optical collimator array, in which the reference numeral 901 designates a fiber array; 903 designates a microlens array; 904 designates an output light beam array: 905 designates a frame for containing micro-ferrules; 906 designates the micro-ferrules; and 907 designates the optical fibers. The optical collimator array is constructed by inserting the optical fibers 906 into the two-dimensionally arranged micro-ferrules 906, and by attaching the planar microlens array 903 to the micro-ferrules 906.

In this way, the present embodiment 4 forms an array consisting of a piece of the tunable wavelength-selective filter. This makes it possible to greatly reduce the cost per channel. In addition, although the conventional liquid crystal tunable wavelength-selective filter is polarization-dependent, slow in response and unsuitable for putting into practice, the liquid crystal tunable wavelength-selective filter using the fine liquid-crystal-droplet-dispersed polymer is superior in that it has polarization-independent characteristics and fast response.

EMBODIMENT 5

Figure 21A:
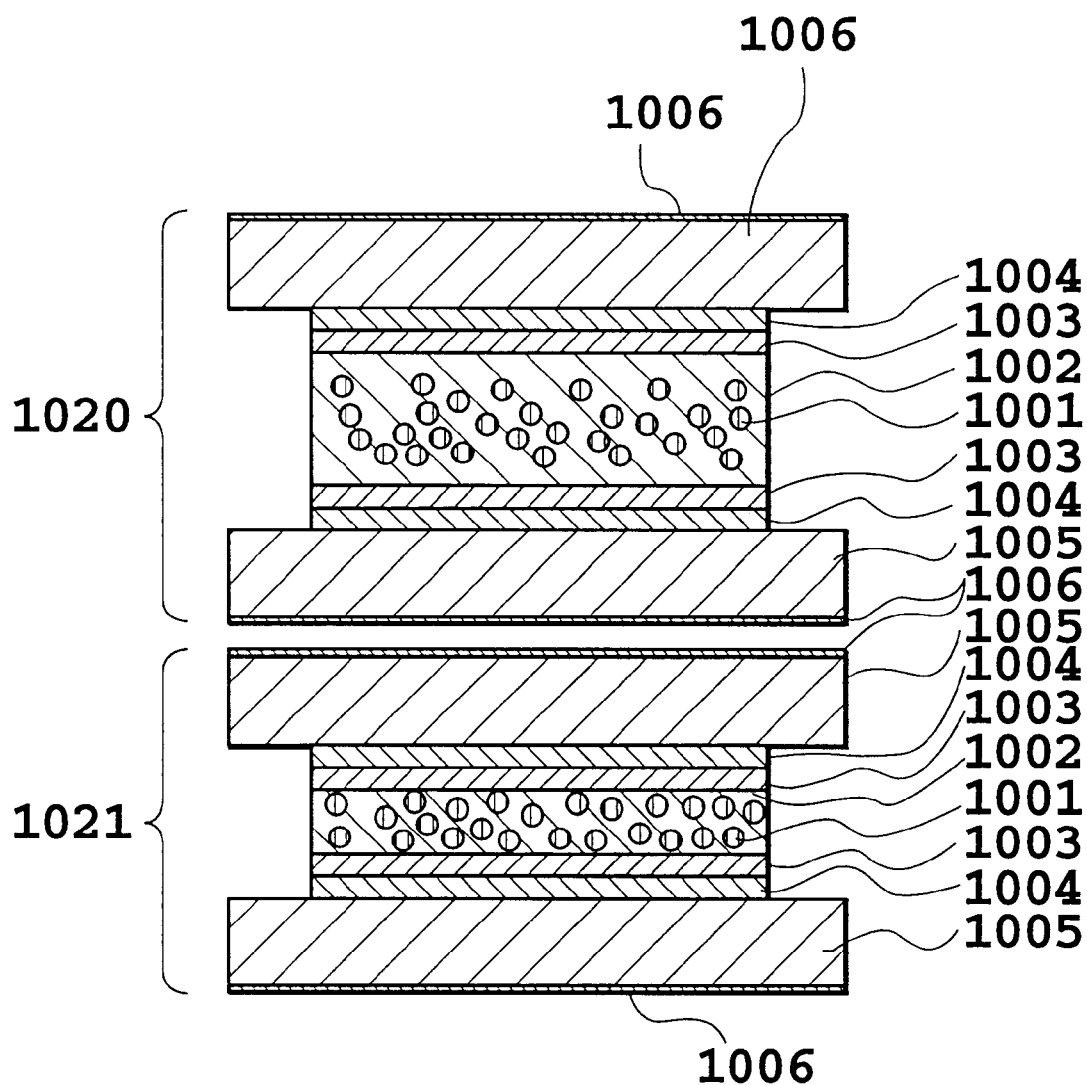

FIG. 21A is a cross-sectional view showing a major portion of an embodiment 5 of the tunable wavelength-selective filter in accordance with the present invention. In FIG. 21A, a reference numeral 1001 designates a nematic liquid crystal droplet whose diameter is equal to or less than 150 nm; 1002 designates a polymer layer; 1003 designates an optical mirror (dielectric mirror) film; 1004 designates a transparent electrode; 1005 designates a transparent glass substrate; and 1006 designates an AR (antireflection) coating.

The foregoing embodiments 1–4 have problems in that the tunable range is as narrow as about 10 nm, and the drive voltage is as high as 400 V. The present embodiment 5 improves these problems.

As shown in FIG. 21A, the present embodiment 5 of the tunable wavelength-selective filter comprises a first tunable wavelength-selective filter 1020 and a second tunable wavelength-selective filter 1021 which are stacked on each other. The cavity gaps of the two tunable wavelength-selective filters differ by a small amount.

FIG. 21B illustrates from top to bottom a spectrum component 1007 of the light passing through the first tunable wavelength-selective filter 1020; a spectrum component 1008 of the light passing through the second tunable wavelength-selective filter 1021; and a spectrum component 1009 of the light passing through the two tunable wavelength-selective filters 1020 and 1021.

As easily seen from FIG. 21B, the spectrum curve 1009 of the light passing through the two tunable wavelength-selective filters is narrower than the other two spectrum curves. This means that the present embodiment 5 can reduce cross-talk. In addition, the top of the spectrum component 1009 is flat. These effects increase with the number of the stacked tunable wavelength-selective filters, and hence the spectrum curve becomes sharper and the cross-talk further reduces. Furthermore, the top of the spectrum component becomes flatter than that of a single filter with the same full width at half maximum, which offers an advantage of being able to increase the tolerance for selecting a wavelength.

FIG. 21C illustrates from top to bottom, spectrum components of the light passing through the first tunable wavelength-selective filter 1020 and their wavelength shift behavior, spectrum components of the light passing through the second tunable wavelength-selective filter 1021 and their wavelength shift behavior, and spectrum components of the light passing through the tunable wavelength-selective filter consisting of the two tunable wavelength-selective filters 1020 and 1021 and their wavelength shift behavior, wherein the cavity gap of the two tunable wavelength-selective filters 1020 and 1021 differ slightly from each other.

Thus, the reference numeral 1011 designates transmission spectrum components of the first tunable wavelength-selective filter 1020 which appear at regular intervals; 1012 designates transmission spectrum components of the second tunable wavelength-selective filter 1021 which appear at regular intervals; and 1013 designates transmission spectrum components of the tunable wavelength-selective filter consisting of the two tunable wavelength-selective filters stacked.

In the Fabry-Perot etalon type tunable wavelength-selective filter, peaks of the transmission wavelengths take place at fixed intervals as illustrated in the top and middle graphs of FIG. 21C. In this case, a larger cavity gap gives a smaller peak spacing (FSR). Accordingly, the two tunable wavelength-selective filters 1020 and 1021 with different cavity gaps have different peak spacings (FSR). When the two tunable wavelength-selective filters are stacked, and one of the peaks of the first tunable wavelength-selective filter 1020 is tuned with that of the second tunable wavelength-selective filter 1021, only one transmission peak takes place because other transmission peaks are out of tuning.

If the peaks of the two transmitted wavelengths are varied in tune with each other in a first wavelength band, the peak of the transmitted wavelength can be varied over the full range of the first wavelength band. Likewise, it can be varied over the full range of a second, third or fourth wavelength band in a similar manner.

Thus, stacking two tunable wavelength-selective filters whose cavity gaps differ slightly makes it possible to vary the wavelength over an apparent range of several tens of nanometers, although the individual tunable wavelength-selective filters can vary it only about 10 nm at most.

Although two tunable wavelength-selective filters 1020 and 1021 with different cavity gaps are stacked in the present embodiment 5, three or more tunable wavelength-selective filters can be stacked, offering a similar advantage.

Thus, the present embodiment 5 can not only narrow the width of the spectrum component and reduce the cross-talk, but also flatten the top of the spectrum component. Besides, controlling the combination of the transmitted wavelengths of individual filters can greatly increase the tunable range of the wavelength.

EMBODIMENT 6

Figure 22:
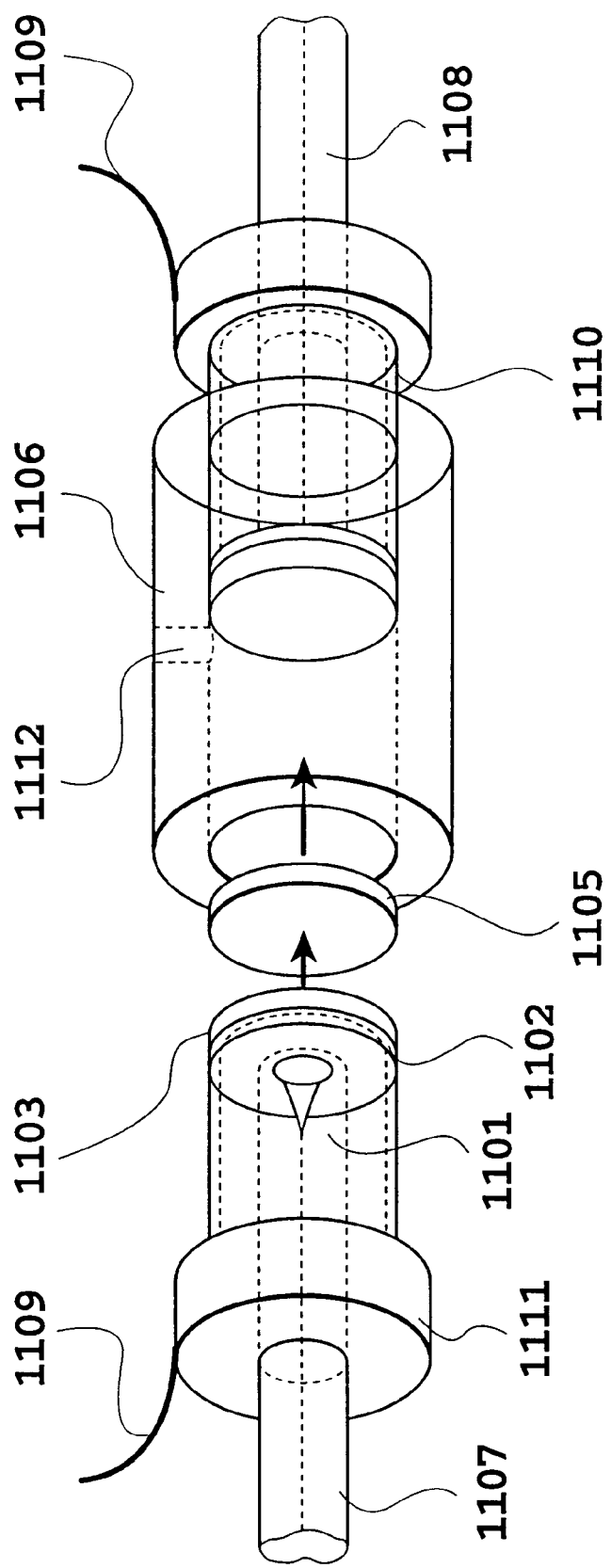
FIG. 22 is an exploded perspective view showing a structure of an embodiment 6 of the tunable wavelength-selective filter in accordance with the present invention.

FIG. 22 is an exploded perspective view showing a structure of an embodiment 6 of the tunable wavelength-selective filter in accordance with the present invention. The present embodiment 6 employs in input and output sections expanded core (TEC) fibers instead of the fiber collimator of the foregoing embodiment 4.

In FIG. 22, the reference numeral 1101 designates a core of an optical fiber; 1102 designates a transparent electrode; 1103 designates an optical mirror (dielectric mirror) film; 1105 designates a fine liquid-crystal-droplet-dispersed polymer layer; 1106 designates a sleeve of an SC connector; 1107 designates an input optical fiber; 1108 designates an output optical fiber; 1109 designates a lead-out electrode; 1110 designates a ferrule; 1111 designates a metal portion at the rear of the ferrule 1110; and 1112 designates a hole bored in the sleeve 1106 for filling a fine liquid-crystal-droplet-dispersed polymer. The transparent electrode 1102 is completely covered with the ferrule 1110 and is connected to the metal portions 1111.

Facing the TEC fibers via a gap makes it possible, as long as the gap is maintained at tens of micrometers to one hundred micrometers, to establish their optical coupling at a very low coupling loss while propagating the light through a free space without using any lenses.

A very small tunable wavelength-selective filter can be implemented by utilizing this characteristics and by employing the TEC fibers and the sleeve 1106 of the SC connector.

The tunable wavelength-selective filter of the present embodiment 6 is fabricated as follows.

First, the TEC fibers 1107 and 1108 are each inserted into the ferrule 1110, and their end faces are polished. Second, the transparent electrode 102 composed of ITO is formed in a sputtering system such that the ferrules 1110 and the metal portions 1111 at their back are covered with ITO.

Third, the optical mirror films 1103 are coated on the ferrules 1110 and the tips of the TEC fibers 1107 and 1108. Fourth, the ferrules 1110 of the input optical fiber 1107 and output optical fiber 1108 are inserted into the sleeve 1106 of the SC connector from its both sides, and the gap between them is adjusted to be maintained at a few to several tens of micrometers with their tips kept parallel. Fifth, a mixture of a UV polymerization resin and a liquid crystal material is poured into the sleeve 1106 of the SC connector through its hole 1112, and the resin is polymerized by the UV irradiation to disperse the liquid crystal droplets in the resin. Finally, the lead-out electrodes 1109 are each connected to the metal portions 1111 at the back of the ferrules 1111.

Thus, the present embodiment 6 can readily implement, using the TEC fibers and SC connector, a polarization-independent, fast tunable wavelength-selective filter with a simple structure at a low cost.

EMBODIMENT 7

A present embodiment 7 of the tunable wavelength-selective filter in accordance with the present invention is an arrayed tunable wavelength-selective filter employing a fiber array composed of TEC fibers.

FIGS. 23–26 are perspective views showing fabrication process of the present embodiment 7 of the tunable wavelength-selective filter in accordance with the present invention. The fabrication process will now be described with reference to these figures.

Figure 23:
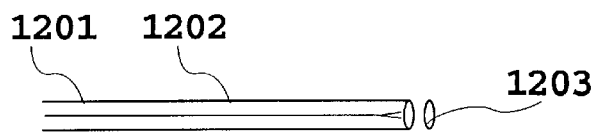
FIGS. 23–26 are diagrams illustrating a fabrication process of an embodiment 7 of the tunable wavelength-selective filter with an array structure in accordance with the present invention.

First, as illustrated in FIG. 23, a TEC fiber 1201 is prepared and severed at its expanded core portion, and its end face is polished. Subsequently, a transparent electrode 1202 composed of ITO is formed by sputtering such that the ITO covers the tip of the TEC fiber over several centimeters.

Then, an optical mirror (dielectric mirror) film 1203 is formed on the end face of the TEC fiber 1201.

Figure 24:
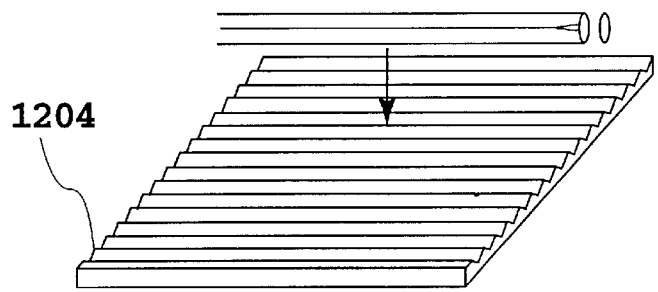

Second, as illustrated in FIG. 24, a V-groove substrate 1204 is prepared which has on its surface an array of V-grooves that are formed at regular intervals. Then, the TEC optical fibers 1201 are fixed in the V-grooves of the V-groove substrate 1204 with an adhesive such that the end faces of the TEC fibers 1201 are aligned with the end of the V-groove substrate 1204.

Figure 25:
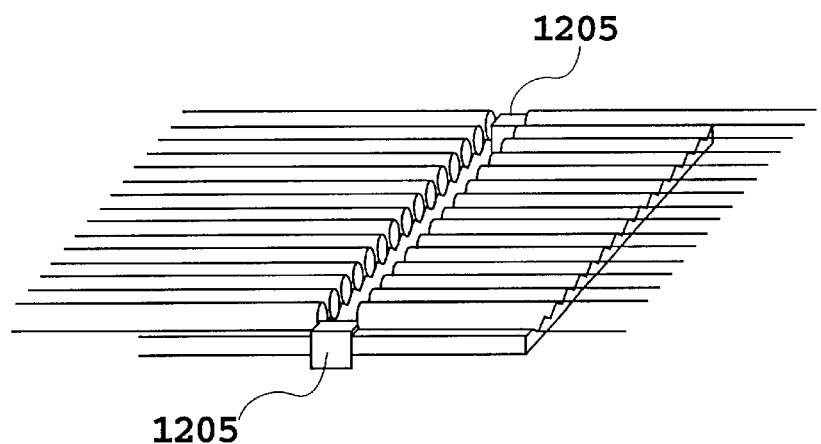

Third, as illustrated in FIG. 25, a pair of the fiber arrays, each of which comprises the TEC fibers 1201 that are arrayed and fixed to the V-grooves on the V-groove substrate 1204, are faced via spacers 1205 and are fixed, adjusting them such that the axes of each pair of the opposing TEC fibers 1201 are aligned, and their opposing end faces become parallel. Here, the gap is controlled to 20–30 micrometers.

Figure 26:
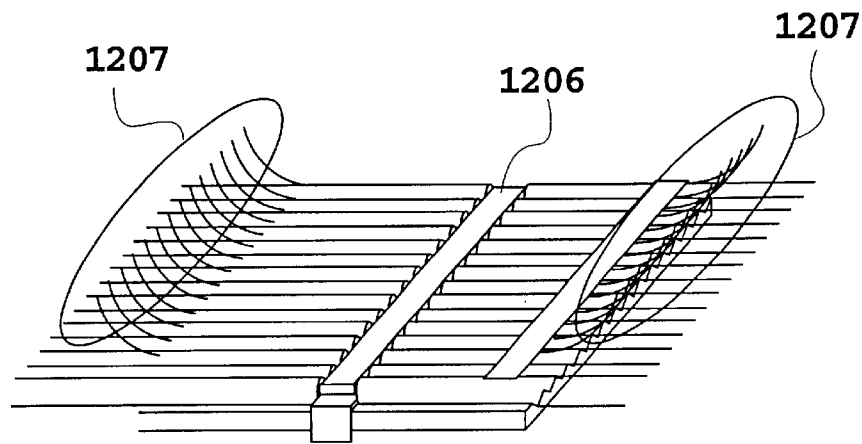

Finally, as illustrated in FIG. 26, a mixture of a UV polymerization resin and a nematic liquid crystal material is poured into the gap formed by the spacers 1205, and is polymerized by UV irradiation, thereby forming a fine liquid-crystal-droplet-dispersed polymer layer 1206. After that, lead electrodes 1207 are connected to the sides of all the TEC fibers 1201.

Thus, the present embodiment 7 can readily implement, using the fiber arrays composed of the TEC fibers, a polarization-independent, fast response arrayed tunable wavelength-selective filter with a simple structure at a low cost.

EMBODIMENT 8

Figure 27:
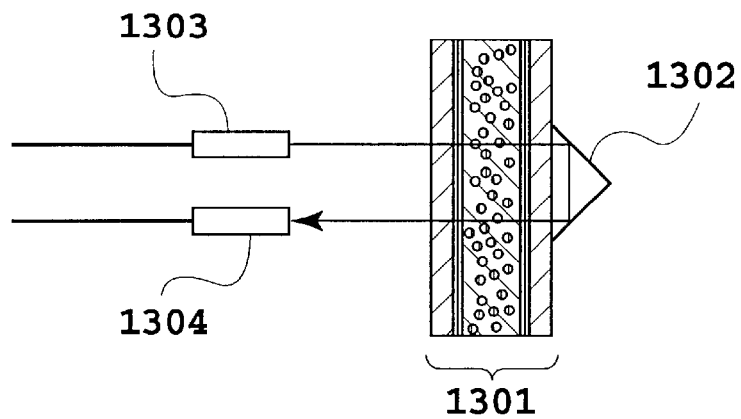
FIGS. 27–29 are cross-sectional views illustrating structures of major portions of an embodiment 8 of the tunable wavelength-selective filter in accordance with the present invention.
Figure 28:
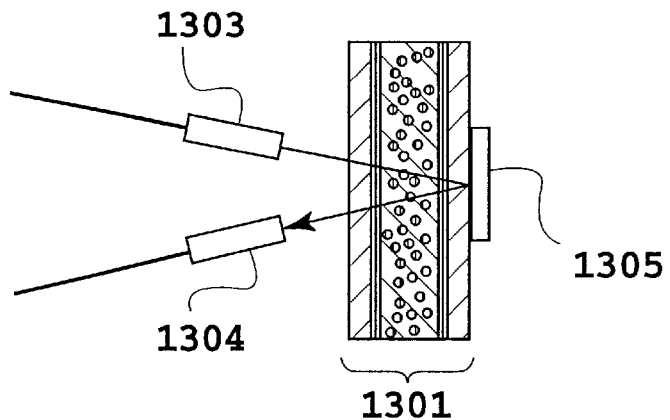
Figure 29:
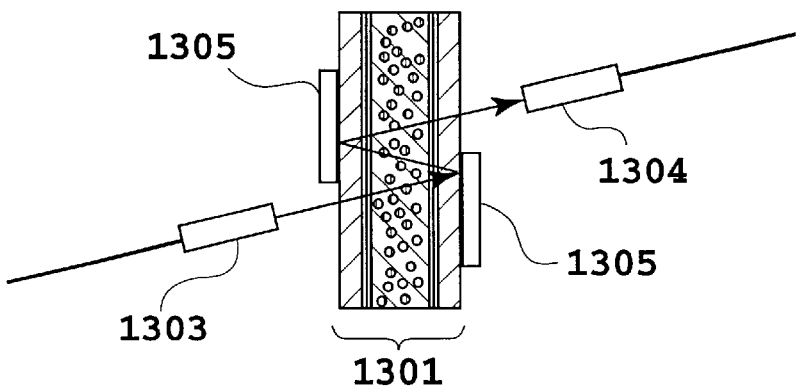

FIGS. 27–29 are cross-sectional views each showing a major portion of an embodiment 8 of the tunable wavelength-selective filter in accordance with the present invention. The present embodiment 8 combines a single tunable wavelength-selective filter with a mirror film to make flatter on top and steeper on the sides of the spectrum peaks, thereby reducing the cross-talk as in the foregoing embodiment 5.

In FIGS. 27–29, the reference numeral 1301 designates a fine liquid-crystal-droplet-dispersed polymer layer including liquid crystal droplets of 150 nm or less in diameter; 1302 designates a prism mirror; 1303 designates an input collimator fiber; 1304 designates an output collimator fiber; and 1305 designates a plane mirror.

FIG. 27 shows the tunable wavelength-selective filter using the prism mirror 1302, and FIG. 28 shows the tunable wavelength-selective filter employing the plane mirror 1305. In either case, an incident light beam is reflected off the mirror 1302 or 1305 to pass through the tunable wavelength-selective filter 1301 twice, thereby achieving the effect similar to that of the tunable wavelength-selective filter comprising two filters stacked together. In the tunable wavelength-selective filter of FIG. 28, although a small amount of polarization dependence of less than a few tenth of decibels takes place because of the oblique incident light beam onto the tunable wavelength-selective filter 1301, this is a trivial problem.

Furthermore, although the position of the emitted beam deviates owing to the changes in the refraction angle involved in the changes in the refractive index of the fine liquid-crystal-droplet-dispersed polymer layer due to the oblique incident light beam, this matters little by setting the incident angle between 88–89 degrees because the beam of 200 micrometers in diameter allows a margin of two degrees for a 5 mm thick tunable wavelength-selective filter.

FIG. 29 shows a structure, in which the tunable wavelength-selective filter 1301 is sandwiched by the two plane mirrors 1305 with their positions slightly displaced with respect to a line normal to the filter, so that the incident light beam, which is slightly tilted away from the normal to the surface of the tunable wavelength-selective filter 1301, is reflected twice off the plane mirrors 1305 that are slightly shifted in their positions, thereby traversing the tunable wavelength-selective filter 1301 three times. This produces an effect of stacking three tunable wavelength-selective filters 1301 using only one tunable wavelength-selective filter 1301.

Although only one collimator fiber is shown here, similar effect can be achieved with an array that comprises a collimator fiber array combined with a filter array.

Thus, the present embodiment 8 causes the incident light to traverse the tunable wavelength-selective filter twice or more using the plane mirror(s) or the prism. This enables the spectrum components to be narrowed to reduce the cross-talk, and the top of the spectrum peaks to be made flatter.

EMBODIMENT 9

Figure 30:
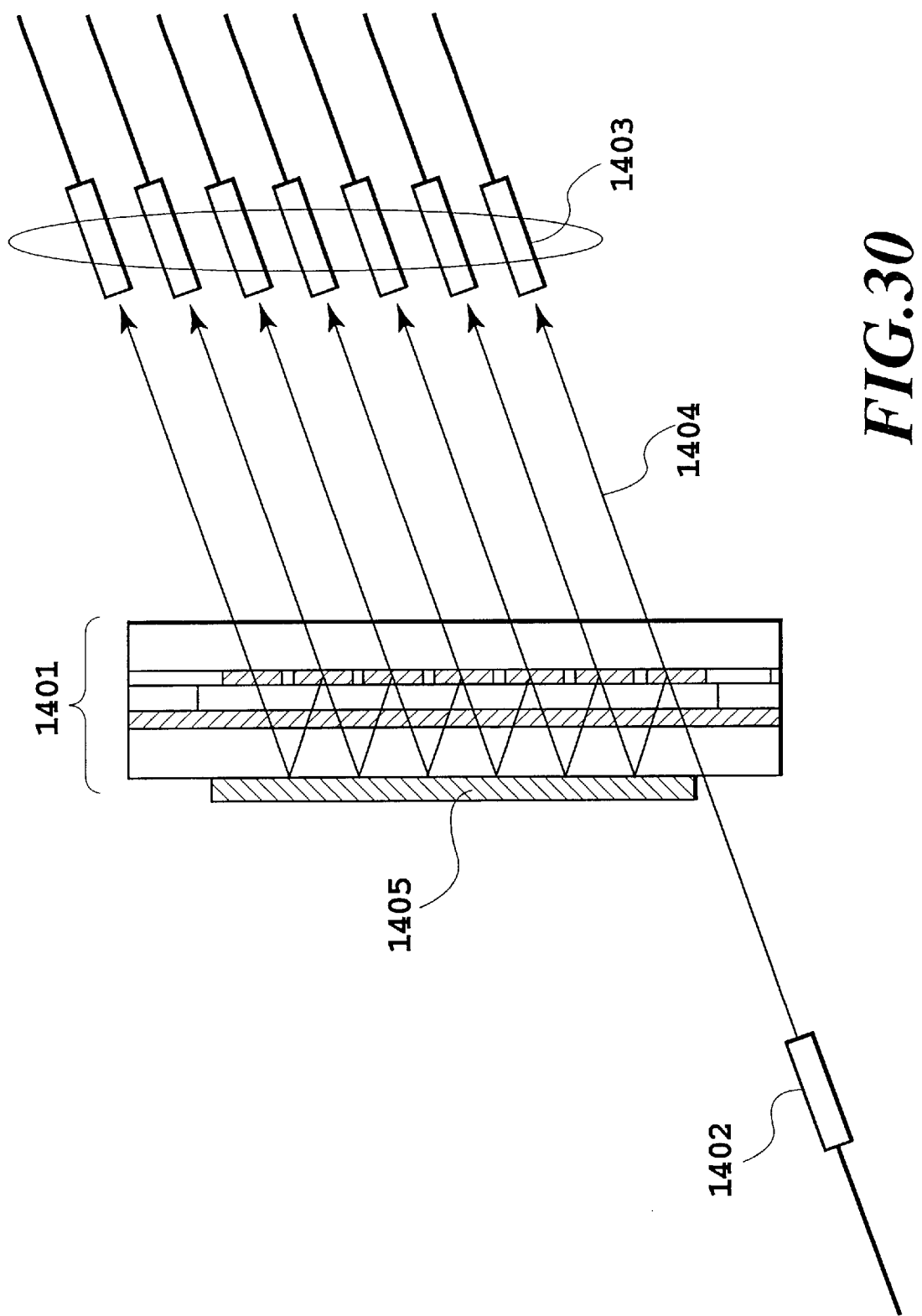
FIG. 30 is a cross-sectional view illustrating a structure of a major portion of an embodiment 9 of the tunable wavelength-selective filter in accordance with the present invention.

FIG. 30 is a cross-sectional view showing a major portion of an embodiment 9 of the tunable wavelength-selective filter in accordance with the present invention. The present embodiment 9 is a tunable optical multiplexer/demultiplexer using a tunable wavelength-selective filter with a fine liquid-crystal-droplet-dispersed polymer layer.

In FIG. 30, the reference numeral 1401 designates a tunable wavelength-selective filter with a fine liquid-crystal-droplet-dispersed polymer layer; 1402 designates an input collimator fiber; 1403 designates an output collimator fiber array; 1404 designates light beams passing through the tunable wavelength-selective filter 1401; and 1405 designates a plane mirror.

In the present embodiment 9, a light beam launched from the input collimator fiber 1402 strikes the arrayed tunable wavelength-selective filter 1401 with its incident angle slightly tilted away from the normal. The light with a wavelength of a transmission peak of the tunable wavelength-selective filter 1401 passes through it, and enters one of the fibers of the output collimator fiber array 1403.

The remainder of the light is reflected twice off the tunable wavelength-selective filter 1401 and the plane mirror, and is launched into the tunable wavelength-selective filter again. Thus, the light with a wavelength of a second transmission peak of the tunable wavelength-selective filter 1401 passes through it, and the remainder of the light is reflected. In this way, the incident light is demultiplexed and output through the output collimator fiber array 1403.

Since the individual electrodes of the arrayed tunable wavelength-selective filter 1401 with the fine liquid-crystal-droplet-dispersed polymer layer can be independently supplied with voltages, the wavelengths of multiplexer/demultiplexer are variably set. Although the present embodiment 9 uses the collimator fiber, it can be replaced with a collimator fiber array.

EMBODIMENT 10

FIGS. 31A–31C are cross-sectional views showing fundamental structures of an embodiment 10 of the tunable wavelength-selective filter in accordance with the present invention. In these figures, the reference numeral 1501 designates a thin film resistor; 1502 designates a current source; 1503 designates a heater; 1504 designates liquid crystal droplets; 1505 designates a polymer layer; 1506 designates an optical mirror layer; 1507 designates a transparent electrode; and 1508 designates a substrate.

In the foregoing embodiments, the transmission wavelengths are varied by applying a high voltage across the transparent electrodes. However, a rather high voltage of a few hundred volts is required as the driving voltage.

In view of this, the present embodiment 10 of the tunable wavelength-selective filter varies the transmission wavelength by changing the temperature of the fine liquid-crystal-droplet-dispersed polymer layer.

First, the tunable wavelength-selective filter as shown in FIG. 31A increases the temperature of its fine liquid-crystal-droplet-dispersed polymer layer with a normal structure by causing a current to flow through at least one of its two transparent electrodes 1507. This will change the refractive index of the fine liquid-crystal-droplet-dispersed polymer layer, thereby varying the transmission wavelength.

Second, the tunable wavelength-selective filter as shown in FIG. 31B increases the temperature of its fine liquid-crystal-droplet-dispersed polymer layer with a normal structure by causing a current to flow through the thin film resistors 1501 with an opening, which are deposited instead of the transparent electrode by the evaporation method. This will change the refractive index of the fine liquid-crystal-droplet-dispersed polymer layer, thereby varying the transmission wavelength.

Third, the tunable wavelength-selective filter as shown in FIG. 31C increases the temperature of its fine liquid-crystal-droplet-dispersed polymer layer without any transparent electrode by causing a current to flow through the heaters 1503 which are provided outside the tunable wavelength-selective filter. This will change the refractive index of the fine liquid-crystal-droplet-dispersed polymer layer, thereby varying the transmission wavelength.

EMBODIMENT 11

Although the fundamental structures of the Fabry-Perot etalon type tunable wavelength-selective filters employing the fine liquid-crystal-droplet-dispersed polymer as their cavity are shown in FIG. 1 and others, and their fabrication methods are described before, a variation thereof is described here as an embodiment 11 of the tunable wavelength-selective filter in accordance with the present invention.

According to the fabrication method described before, the fundamental structure is formed by spin coating, on the transparent substrate on which the transparent resin and optical mirror film are deposited, the film of the mixed liquid of a liquid crystal material and a photo polymerization or thermo polymerization prepolymer. Since the fabrication process as far as this step is carried out in an analogous fashion in the present embodiment 11, the description thereof is omitted here.

The present embodiment is fabricated by stacking, on the fine liquid-crystal-droplet-dispersed polymer that is fabricated through the foregoing process, the optical mirror and transparent electrode in sequence, and by dicing it to 5 mm or less squares by a dicing saw for each transparent substrate.

FIGS. 32A to 32G are perspective views each illustrating a fabrication process of the present embodiment 11 of the tunable wavelength-selective filter module with an optical fiber in accordance with the present invention. The process will be described in order with reference to these FIGS. 32A to 32G.

Figure 32A:
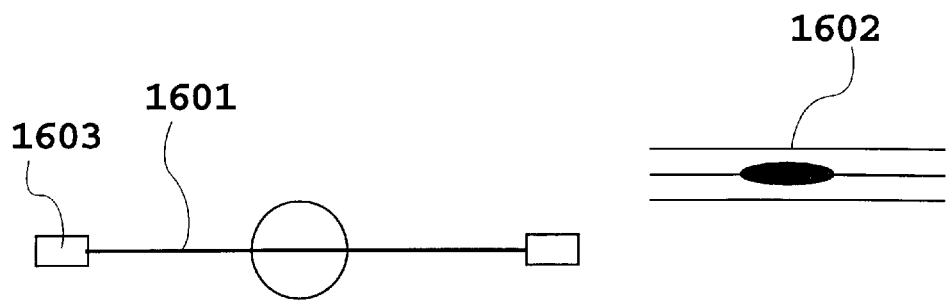
FIG. 32A–32G are perspective views illustrating fabrication process of a tunable wavelength-selective filter module with an additional optical fiber, which uses a filter fabrication method of an embodiment 11 in accordance with the present invention.
Figure 32B:
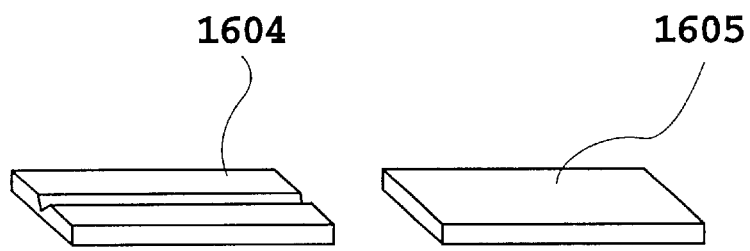

(1) First, as shown in FIG. 32A, an optical fiber 1601 is prepared with its ends each connected with a connector. To reduce the loss of the tunable wavelength-selective filter, it is preferable that a TEC fiber with its core expanded at the center as indicated by the reference numeral 1602 be used as the optical fiber 1601, although a normal optical fiber with a normal core can be used.

(2) A substrate such as a glass substrate, plastic substrate or ceramic substrate is prepared. In this case, it is preferable that the substrate have on its surface a groove for embedding the optical fiber 1601, such as a grooved substrate 1604 of FIG. 32B, although a flat substrate 1605 can be used.

Figure 32C:
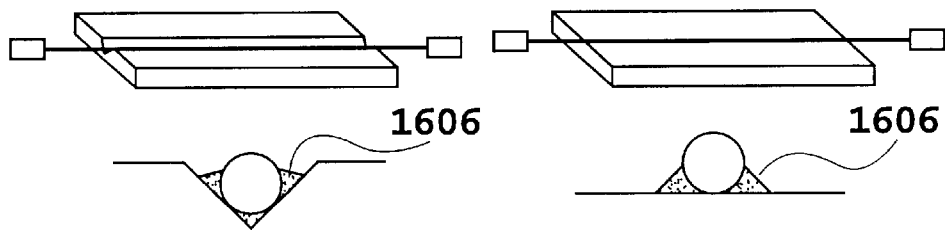

(3) The optical fiber 1601 is fixed on the substrate 1604 or 1605 with an adhesive as shown in FIG. 32C.

Figure 32D:
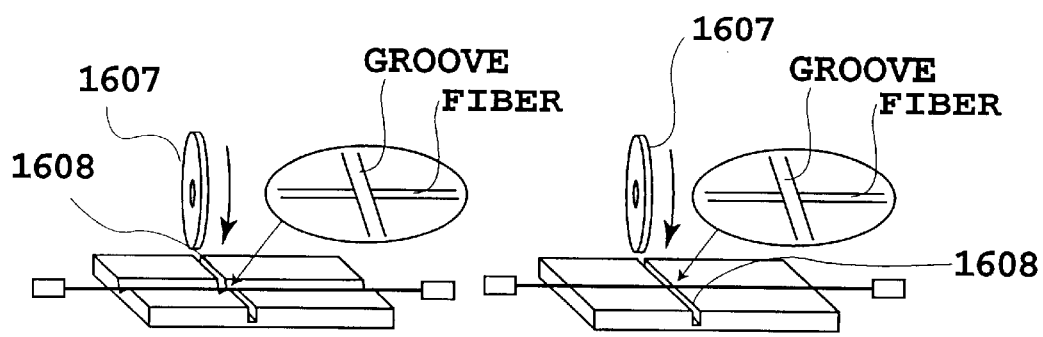

(4) A groove 1608 to which a filter 1609 (FIG. 32E) is to be inserted is formed in the surface of the substrate 1604 or 1605 using a dicing saw 1607 in such a manner that the core of the optical fiber 1601 is exposed as shown in FIG. 32D. To reduce the light reflected off the filter 1609, the groove 1608 is preferably slanted against the optical fiber 1601 with an angle of about 80 degrees. The width of the groove 1608 corresponds to the thickness of the filter 1609.

Figure 32E:
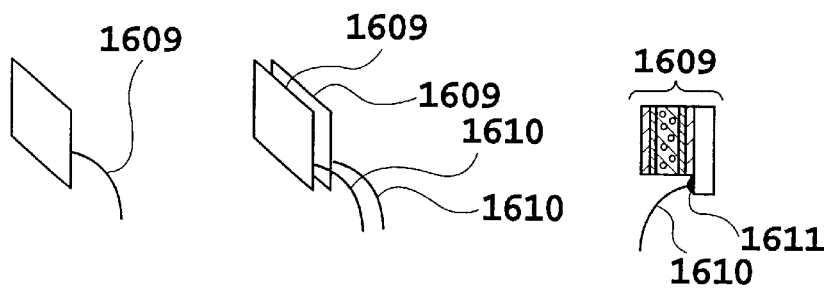

(5) A filter 1609 is prepared which is saw-diced to a few millimeter square. Only an edge of an upper transparent electrode, fine liquid-crystal-droplet-dispersed polymer layer and optical mirror film is removed, and a lead electrode 1610 is connected to the transparent electrode on the glass using a conductive paste or solder, which is shown in FIG. 32E.

Figure 32F:
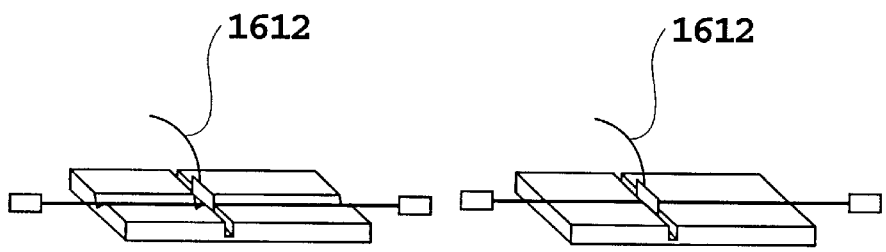

(6) The filter 1609 is placed into the groove 1608 formed on the substrate 1604 or 1605 as shown in FIG. 32F, and is fixed with an adhesive whose refractive index matches that of the filter 1609. Two or more filters can be stacked as needed.

Figure 32G:
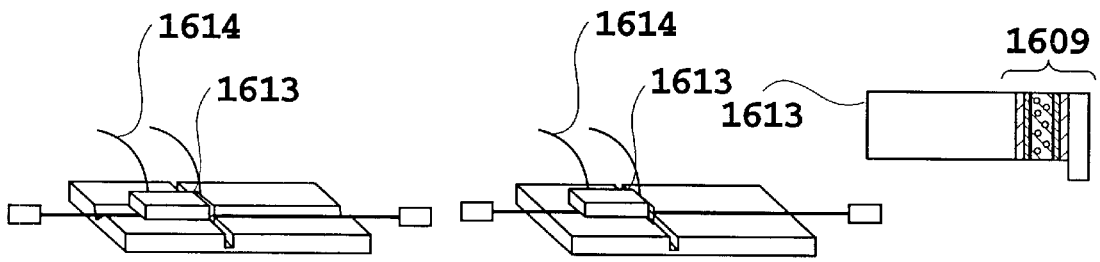

(7) Finally, as shown in FIG. 32G, a lead electrode is attached to the upper transparent electrode of the filter by pressing to the upper transparent electrode a contact bar 1613 to which a lead electrode 1614 is connected. Although a conductive paste can be used to attach the lead electrode to the upper transparent electrode, this might cause a short circuit because the conductive paste can seep into the filter 1609.

Although the present embodiment 11 described a case in which only a single optical fiber 1601 is mounted on the substrate 1604 or 1605, multiple optical fibers can be mounted on the substrate 1604 or 1605 to form an arrayed tunable wavelength-selective filter as described before.

EMBODIMENT 12

FIGS. 33A to 33F are perspective views and cross-sectional views each illustrating a fabrication process of an embodiment 12 of the tunable wavelength-selective filter in accordance with the present invention. Although the previous embodiment 11 of the filter is fabricated by stacking on the thin glass substrate the first layer, fine liquid-crystal-droplet-dispersed polymer layer and second layer, the present embodiment 12 is fabricated using a film-like fine liquid-crystal-droplet-dispersed polymer layer without employing any glass substrate.

A fabrication process of the present embodiment 12 of the tunable wavelength-selective filter will now be described in order with reference to FIGS. 33A to 33F.

(1) First, as shown in FIG. 33A, a substrate 1701 for use in forming a film is prepared.

(2) A mixed liquid of a polymer solution and a nematic liquid crystal material is coated on the substrate 1701 by the spin coating, and is polymerized by UV irradiation or heating to form a fine liquid-crystal-droplet-dispersed polymer layer 1702, which is shown in FIG. 33B. Here, as the polymer solution, a heat-resistant material is preferably used considering the evaporation process it will undergo in the following steps. For example, a UV polymerization adhesive or thermo polymerization epoxy adhesive can be used.

The thickness of the fine liquid-crystal-droplet-dispersed polymer layer 1702 ranges from about ten micrometers to several tens of micrometers. Since the fine liquid-crystal-droplet-dispersed polymer layer 1702 forms the cavity of the tunable wavelength-selective filter, a very high film uniformity is required of the fine liquid-crystal-droplet-dispersed polymer layer 1702. Thus, the maximum permissible unevenness of the film thickness is less than 0.5 $\mu$m/cm.

(3) The film-like fine liquid-crystal-droplet-dispersed polymer layer 1702 is peeled off from the substrate 1701, as shown in FIG. 33C.

(4) The fine liquid-crystal-droplet-dispersed polymer layer 1702 which is peeled off is affixed uniformly to a frame 1703 such that no wrinkles are left, which is shown in FIG. 33D.

(5) Then, as shown in FIG. 33E, a first layer and a second layer, each consisting of an optical mirror film 1704 and a transparent electrode 1705, are formed on either side of the fine liquid-crystal-droplet-dispersed polymer layer 1702 using vacuum evaporation or sputtering process.

(6) Finally, as shown in FIG. 33F, a film-like filter 1706 (called "film filter" from now on) of a 5 mm square is diced.

The film filter 1706 fabricated through the process as illustrated in FIGS. 33A to 33F also forms a Fabry-Perot etalon type tunable wavelength-selective filter in which the fine liquid-crystal-droplet-dispersed polymer layer 1702 is sandwiched by the transparent electrodes 1705 and optical mirror films 1704, so that the transmission wavelength is tunable by applying a voltage to the transparent electrodes 1705.

FIGS. 34A to 34G are perspective views each illustrating a fabrication process of an optical fiber attached tunable wavelength-selective filter module of the present embodiment 12 in accordance with the present invention.

The fabrication method of the optical fiber attached tunable wavelength-selective filter module will now be described with reference to FIGS. 34A to 34G.

Since the steps (1)–(4) are analogous to those of the preceding embodiment 11 as shown in FIGS. 32A to 32D, the description thereof will be omitted here.

Figure 34A:
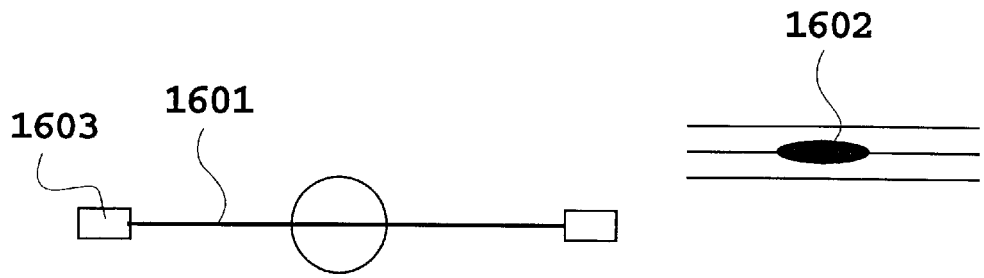
FIG. 34A–34G are perspective views illustrating a fabrication process of a tunable wavelength-selective filter module with an additional optical fiber, which uses a filter fabrication method of the embodiment 12 in accordance with the present invention.
Figure 34B:
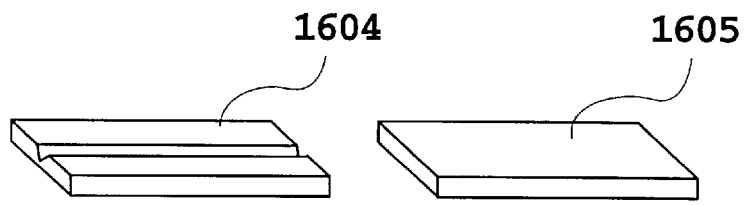
Figure 34C:
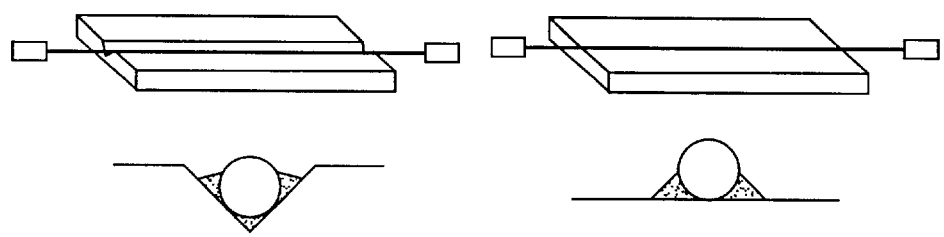
Figure 34D:
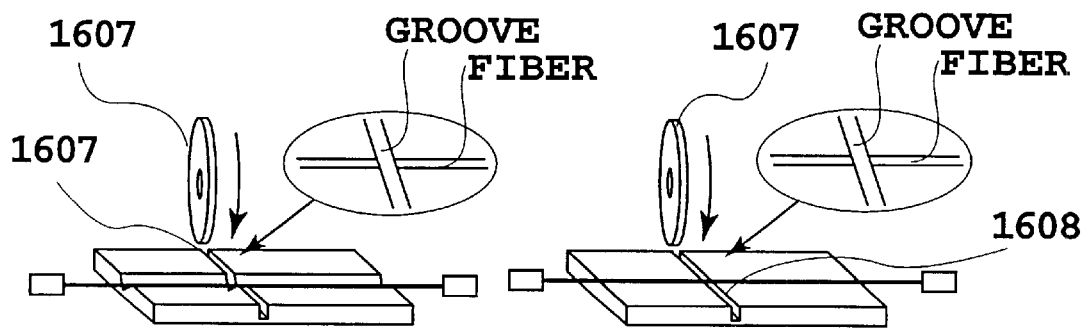
Figure 34E:
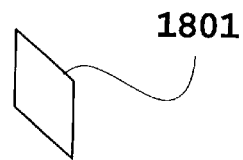

(5) As shown in FIG. 34E, a film filter 1801 of a few millimeter square (that is, the film filter 1706 fabricated through the process of FIGS. 33A to 33F) is prepared.

Figure 34F:
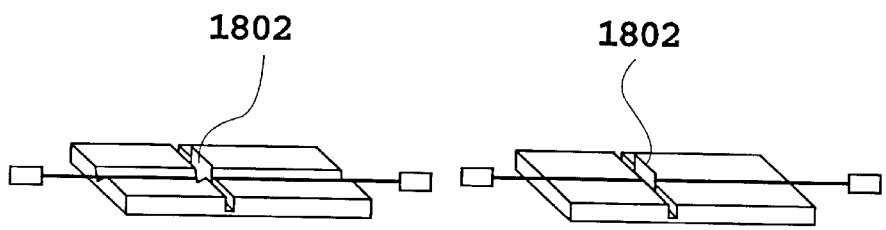

(6) The film filter 1801 is then placed into the groove 1608 formed on the substrate 1604 or 1605 as shown in FIG. 34F, and is fixed with an adhesive 1802 whose refractive index matches that of the film filter 1801.

Figure 34G:
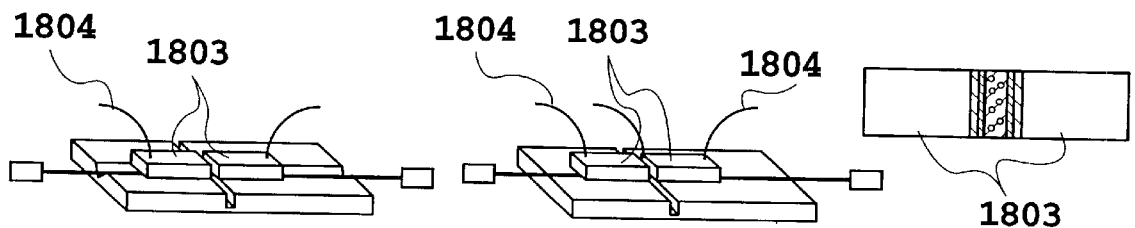

(7) Finally, as shown in FIG. 34G, lead electrodes are attached to the transparent electrodes of the film filter 1801 by tightly pressing the film filter from its both sides by contact bars 1803, each of which is connected with a lead electrode 1804.

Although the present embodiment 12 described a case in which only a single optical fiber 1601 is mounted on the substrate 1604 or 1605, multiple optical fibers can be mounted on the substrate 1604 or 1605 to form an arrayed tunable wavelength-selective filter as described before.

Next, cost estimation is as follows of the optical fiber attached tunable wavelength-selective filter module produced by the foregoing fabrication processes.

A most expensive step in the foregoing processes is one that forms the optical mirrors and transparent electrodes, which costs about 300,000 yen. Assuming to dice 1 mm square filter (1706) from a substrate of three inches in diameter, one piece will cost about 70 yen. Accordingly, the major portion of the cost of the optical fiber attached tunable wavelength-selective filter modules of the foregoing embodiments will be covered by the cost of the optical fiber 1601 and connector 1603 plus the cost for forming the grooves, giving a general estimate of about 10,000 yen per tunable wavelength-selective filter. Considering the fact that the cost of a current tunable wavelength-selective filter is about a million yen, the expense is reduced by a factor of 100.

Furthermore, since the tunable wavelength-selective filters of the foregoing embodiments are film-like, they can be stacked in a multilayer, which enables the extinction ratio of the filter 1609 or 1801 to be greatly reduced. In addition, the foregoing embodiments of the filters have an advantage of obviating the alignment of the light beam.

The present invention has been described in detail with respect to various embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A tunable wavelength-selective filter of a Fabry-Perot etalon type, said tunable wavelength-selective filter comprising:
    a first layer including a transparent electrode and an optical mirror layer;
    a third layer including a transparent electrode and an optical mirror layer; and
    a second layer which is composed of an electro-optic material whose refractive index changes depending on electric field, and sandwiched between said first layer and said third layer,
    wherein said electro-optic material whose refractive index changes depending on electric field is composed by liquid crystal droplets dispersed in a polyene polythiol polymer which contains plasticizer, said liquid crystal droplets equal to or less than 150 nm in diameter consist of nematic liquid crystal droplets.

2. The tunable wavelength-selective filter as claimed in claim 1, wherein said first layer and said third layer are each formed on a glass substrate.

3. The tunable wavelength-selective filter as claimed in claim 2, wherein said optical mirror layer consists of a dielectric multilayer mirror with an optical reflectance of 95% for 1.5 $\mu$m wavelength light, and said glass substrate has a finishing surface precision of equal to or less than $\lambda$/10, where $\lambda$ is a wavelength of light that traverses the tunable wavelength-selective filter.

4. The tunable wavelength-selective filter as claimed in claim 1, further comprising a transparent film with a refractive index approximately equal to that of said second layer, said transparent film being inserted into an interface between said first layer and said second layer, or into an interface between said second layer and said third layer.

5. The tunable wavelength-selective filter as claimed in claim 1, wherein at least one of said 10 transparent electrodes has a strip-like pattern or a dot-like pattern.

6. The tunable wavelength-selective filter as claimed in claim 1, wherein said tunable wavelength-selective filter is stacked on another tunable wavelength-selective filter with a same structure and a different cavity gap.

7. The tunable wavelength-selective filter as claimed in claim 1, wherein said tunable wavelength-selective filter is sandwiched between expanded core fibers or between expanded core fiber arrays.

8. The tunable wavelength-selective filter as claimed in claim 1, further comprising on a second side of said tunable wavelength-selective filter one of a prism mirror and a plane mirror, wherein one of a light beam and a light beam array, which is incident on a first side of said tunable wavelength-selective filter, passes through said tunable wavelength-selective filter, reflects off said one of said prism mirror and said plane mirror, passes through said tunable wavelength-selective filter again, and is emitted from the first side of said tunable wavelength-selective filter.

9. The tunable wavelength-selective filter as claimed in claim 8, further comprising one of an input collimator fiber and an input collimator fiber array for emitting said one of said light beam and said light beam array to said tunable wavelength-selective filter; and one of an output collimator fiber and an output collimator fiber array, into which one of a light beam and a light beam array from said tunable wavelength-selective filter is launched.

10. The tunable wavelength-selective filter as claimed in claim 1, further comprising a first plane mirror disposed on a first side of said tunable wavelength-selective filter, a second plane mirror disposed on a second side of said tunable wavelength-selective filter, said first plane mirror and said second plane mirror being unaligned with respect to a line normal to said tunable wavelength-selective filter, wherein one of a light beam and a light beam array, which is obliquely incident on the first side of said tunable wavelength-selective filter, traverses said tunable wavelength-selective filter, reflects off said second plane mirror, traverses said tunable wavelength-selective filter again, reflects off said first plane mirror, and is emitted from the second side of said tunable wavelength-selective filter.

11. The tunable wavelength-selective filter as claimed in claim 1, further comprising a plane mirror disposed on a first side of said tunable wavelength-selective filter, wherein one of a light beam and a light beam array, which is obliquely incident on one of the first side and a second side of said tunable wavelength-selective filter, progresses with undergoing multiple reflections between said plane mirror and said optical mirror layer of said tunable wavelength-selective filter, while one of a light beam and a light beam array having a wavelength corresponding to a transmission wavelength of said tunable wavelength-selective filter is output from the side opposite to the incident side.

12. The tunable wavelength-selective filter as claimed in claim 1, further comprising a heater for heating said second layer.

13. The tunable wavelength-selective filter as claimed in claim 12, further comprising on said transparent electrode a current supply for causing a current to flow for heating said second layer.

* * * * *

UNITED STATES PATENT AND TRADEMARK OFFICE
CERTIFICATE OF CORRECTION

PATENT NO.     : 6,545,739 B1
DATED          : April 8, 2003
INVENTOR(S)    : Matsumoto et al.

It is certified that error appears in the above-identified patent and that said Letters Patent is hereby corrected as shown below:

<u>Column 22,</u>
Line 64, after the word "said", delete the number "10".

Signed and Sealed this

Twenty-sixth Day of August, 2003

JAMES E. ROGAN
*Director of the United States Patent and Trademark Office*